United States Patent [19]

Rubens et al.

[11] Patent Number: 4,485,193
[45] Date of Patent: Nov. 27, 1984

[54] EXPANDABLE SYNTHETIC RESINOUS THERMOPLASTIC PARTICLES, METHOD FOR THE PREPARATION THEREOF AND THE APPLICATION THEREFOR

[75] Inventors: Louis C. Rubens; Willard E. Alexander, both of Midland, Mich.

[73] Assignee: The Dow Chemical Company, Midland, Mich.

[21] Appl. No.: 600,751

[22] Filed: Apr. 16, 1984

Related U.S. Application Data

[63] Continuation-in-part of Ser. No. 493,194, May 10, 1983.

[51] Int. Cl.³ .............................. C08J 9/22; C08J 9/24
[52] U.S. Cl. ........................................ 521/58; 264/53; 264/DIG. 5; 264/DIG. 9; 264/DIG. 15; 521/146; 521/147; 521/910
[58] Field of Search ............. 521/58; 264/53, DIG. 5, 264/DIG. 9, DIG. 15

[56] References Cited

U.S. PATENT DOCUMENTS

| | | | |
|---|---|---|---|
| 2,986,537 | 5/1961 | Chaumeton et al. | 521/58 |
| 2,998,396 | 8/1961 | Nickolls | 521/60 |
| 3,013,996 | 12/1961 | Pollard | 521/58 |
| 3,126,432 | 3/1964 | Schuur | 521/58 |
| 3,631,133 | 12/1971 | Battigelli | 521/58 |
| 3,725,320 | 4/1973 | Wang | 521/98 |
| 4,172,928 | 10/1979 | Alveres et al. | 521/58 |
| 4,366,263 | 12/1982 | Sato et al. | 521/143 |
| 4,393,146 | 7/1983 | Rigler et al. | 521/58 |
| 4,407,977 | 10/1983 | Rigler et al. | 521/58 |
| 4,418,156 | 11/1983 | Rigler et al. | 521/58 |

Primary Examiner—Morton Foelak
Attorney, Agent, or Firm—R. B. Ingraham

[57] ABSTRACT

Resilient foam particles and moldings are obtained employing a lightly crosslinked polymer such as a styrene polymer with volatile fluid foaming agent that has low permeability through the polymer. Multiple expansion will permit low density particles for molding.

15 Claims, 1 Drawing Figure

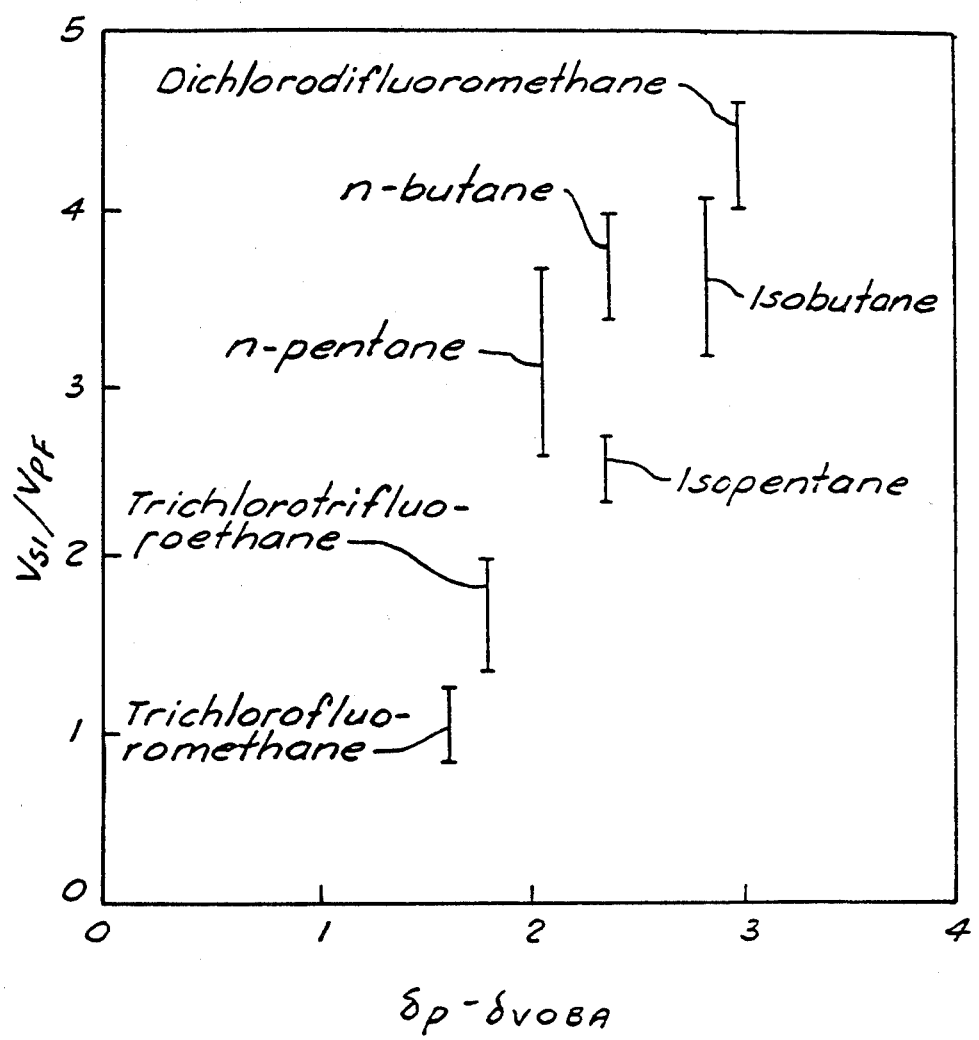

EXPANDABLE SYNTHETIC RESINOUS THERMOPLASTIC PARTICLES, METHOD FOR THE PREPARATION THEREOF AND THE APPLICATION THEREFOR

This application is a continuation-in-part of copending application Ser. No. 493,194, filed May 10, 1983.

Expandable synthetic resinous particles, the preparation of such particles, expansion of such particles and the fabrication of such particles into various shaped objects is well known in the art. The most common of the expandable particles presently available are expandable polystyrene particles. Many well known shaped articles are prepared by molding such expandable polystyrene particles such as foam plastic cups, foam coolers, various shaped dunnage materials and the like. Such particles of expandable polystyrene generally are available in a variety of sizes, the sizes ranging from less than 1 millimeter to several millimeters in size, prior to expansion. Expandable particles having varied configuration are also known which on expansion provide foamed dunnage material for loose fill packaging. Such expandable polystyrene particles usually consist of a polystyrene matrix having contained therein a volatile fluid foaming agent, oftentimes a chlorofluorocarbon and more frequently an aliphatic hydrocarbon such as pentane. Generally, such particles are expanded or foamed by heating either in hot air, hot liquid or by steam, steam being one of the more frequently employed heating media. Steam provides a convenient and relatively rapid means of heating the particles to a desired foaming temperature. Steam is generally employed as a heating means because of its high heat capacity, rapid transfer of heat to the expanding particle and ready availability. Usually, such expandable particles when heated for a short time with an appropriate heating medium such as steam, often expand to a volume which generally corresponds to a volume somewhat less than the theoretical volume of the volatile fluid foaming agent at the temperature of expansion when the particles are cooled to ambient temperature. In many cases where the permeability of the volatile fluid foaming agent is low relative to the permeability rate of air through the cell walls of the expanded particle, expansion in excess of the theoretical volume as might be determined from the pressure/volume/temperature relationship of the volatile fluid foaming agent may be obtained. This is often referred to as the osmotic effect, wherein additional blowing or expanding capability is obtained by diffusion of the air into the expanded particle at a rate substantially greater than the diffusion of the volatile fluid foaming agent out of the expanded particle. In such instances air is generally considered as a secondary blowing agent. Oftentimes when such particles have been expanded in the presence of air or steam, or air and steam, and the particles are cooled relatively rapidly to ambient temperature, shrinkage is frequently observed wherein the size or volume of the particle appears markedly reduced as the temperature is reduced. Judicious aging of such particles generally in an air atmosphere will result oftentimes in a return of the particles to the original expanded volume. Judicious aging of the particles in an air atmosphere frequently results in additional diffusion of air into the cells resulting in a total pressure within the cells greater than atmospheric pressure, in which case further expansion of the particle can be obtained when heated to an appropriate expanding temperature. Such an expanding temperature is usually from about 20 to 50 degrees centigrade over the glass temperature of the expandable polymer. Spherical and nonspherical particles of the expandable variety advantageously are employed in many instances as loose-fill dunnage materials. Such dunnage materials are commercially available in a variety of configurations that have achieved significant commercial success. The majority of the expandable particles employed in commerce are of a generally spherical configuration and are employed for the molding of a variety of shaped articles. Expandable plastic particles of relatively small diameter are utilized for the molding of the familiar plastic foam cups, often referred to as bead cups, whereas the larger diameter particles are employed for the preparation of shaped dunnage, molding of shaped articles as shaped dunnage, food coolers, insulation board and the like. Some of the expandable plastic particles are employed for the extrusion of foamed sheet which frequently is further shaped into containers, such as are employed in the fast food restaurants, meat trays, egg cartons, apple trays and the like. Expandable synthetic resinous thermoplastic particles have also been employed in the decorative area wherein particles have been adhered to a base, for example paper, and subsequently foamed to provide a desired raised configuration. They also have been molded or shaped into a desired configuration, and decoration subsequently added thereto. The versatility of such synthetic foamable resinous particles and articles prepared therefrom has given rise to considerable commercial activity. There are a variety of modes for the preparation of such particles, a variety of methods for the expansion of such particles, and several methods of molding such particles into shaped articles. Generally, expandable synthetic resinous particles or expanded synthetic resinous particles must be molded within a relatively limited temperature range, the temperature must be sufficiently high to cause expansion of the particle and fusion of the particles with adjacent particles to form a unitary body. However, the temperature must not be sufficiently high that the molded articles collapse. Generally, if such particles are heated excessively and collapse during or after molding, the resultant molded body will have a volume less than the volume of the mold and consequently a shape which is usually undesired. In order to broaden the operable molding range of expandable synthetic resinous thermoplastic particles, some particles having been designated as thermal collapse resistant particles. Usually such particles are prepared employing a very minor amount of crosslinking agent which extends, considerably, the temperature range over which they may be utilized or expanded. Such crosslinking is most often accomplished during the polymerization of the particles. The quantity of the crosslinking agent employed to prepare thermal collapse resistant particles varies over a generally narrow range and provides usually generally only sufficient crosslinking to render the particles swellable but insoluble in a solvent for a corresponding polymer prepared without benefit of a crosslinking agent. Usually the desired amount of crosslinking agent is that which is sufficient to render the particles insoluble and yet exhibit a maximum, or at least a close to maximum, degree of swelling when placed in a solvent for the linear polymer.

A large number of United States Letters patent exist which are concerned with expandable synthetic resinous thermoplastic particles as dunnage and with the preparation of such particles, the expansion of such particles, equipment for the expansion of the particles and molding of the particles. A representative number of these patents are set forth below, the teachings of which are herewith incorporated by reference thereto: U.S. Pat. Nos. 2,275,164; 2,409,910; 2,532,243; 2,681,321; 2,779,062; 2,848,427; 2,848,428; 2,860,378; 2,875,186; 2,884,386; 2,941,964; 2,952,594; 2,986,537; 3,015,851; 3,056,753; 3,058,162; 3,060,513; 3,126,354; 3,207,820; 3,400,037; 3,424,827; 3,577,360; 3,598,769; 3,639,551; 3,738,020; 3,887,672; 4,027,064; 4,173,608; 4,174,430; 4,226,942.

Generally, the products prepared from such expandable particles may be classified into two general categories. One, low density, usually having a density of from about one pound per cubic foot to about 3 pounds per cubic foot and high density foams which often have densities ranging from about 20 to 30 pounds per cubic foot. For many applications, it is desired to have low density foamed articles, and for many applications densities desirable are even lower. Most foams fabricated from polystyrene are relatively stiff and non-resilient and are what may be considered to be relatively rigid foams. For example, many of these foams when crushed to 10 percent of their original volume do not readily recover to a dimension even approximating their original dimension prior to crushing. A general goal in the preparation of synthetic resinous foamed articles from expandable synthetic resinous foamed particles is to obtain maximum volume having maximum physical properties and employing the minimum quantity of raw materials. When the term density is employed, it refers to the true density of a particle or molded article and not to the bulk density of a plurality of particles. Bulk density shall be specified as such. The prior art refers to some expanded particles and articles having density below about 1 pound per cubic foot. However, such particles and articles in general have been very brittle, and although of low density have had physical properties such that they have been of no commercial significance. Such low density materials may have found some limited applications, but in general have not been significant in the commercial field. Low density expanded synthetic resinous particles may be molded into shaped of various types. However, if the resultant product is brittle, it is usually not satisfactory for practical applications. For example, in the field of thermal insulation, a sheet of insulation, for example 4 feet by 8 feet or 2 feet by 8 feet, must have substantial physical resistance to mechanical handling for installation in order to be of commercial desirability. Breakage of such sheets is expensive both from a material standpoint and from the standpoint of the additional labor required to either repair or replace such articles.

It is therefore an object of the present invention to provide an expandable synthetic resinous particle which may be expanded to a density of less than 1 pound per cubic foot which can be formed into a foam body which is resilient.

It is a further object of this invention to provide a method for the preparation of such particles.

A further object of the invention is to provide a method for the foaming of such particles to provide a foamed particle of a desired low density.

Also included within the objects of this invention is a method for the preparation of molded articles of very low density, prepared from particles in accordance with the present invention.

These benefits and other advantages in accordance with the present invention are obtained in a plurality of heat expandable synthetic resinous particles, the particles forming a gel when placed in a solvent for an uncrosslinked composition of generally like monomeric constitution, the particles having a swelling factor of at least 20 and a crosslinking coefficient of from about 0.8 to about 2.5 with the further limitation that the particles on heating to a temperature above the glass transition temperature of the polymer expand to at least 40 times their original volume at ambient temperature and on being pressurized at a pressure of at least 3 atmospheres in air for a period of 24 hours be capable of two-fold expansion when subjected to the conditions employed to expand the particles to at least 40 times their original volume.

Also contemplated within the scope of the present invention is a plurality of synthetic resinous particles, the synthetic resinous particles comprising a copolymer of styrene and divinylbenzene, the particles forming a gel when placed in toluene at ambient temperature wherein the ratio of the weight of the swollen gel to the unswollen particle obtained by immersion of a particle in toluene is between about 20 and 35, the particles containing a volatile organic blowing agent selected from the group consisting of fluorocarbons and hydrocarbons and mixtures thereof, the polymer of the particles having a crosslinking coefficient of from about 0.8 to about 2.5; the particles being capable of expanding to at least 40 times their unfoamed volume at a temperature of 130° centigrade with the further limitation that the foamed particles on being pressurized at a pressure of at least 3 atmospheres of air for a period of 24 hours are capable of a two-fold expansion when subsequently heated to a temperature of 130° centigrade; with the further limitation that the particles be expandable to a density of less than 0.75 pound per cubic foot.

Also contemplated within the scope of the present invention is a method for the preparation of a resilient coherent foamed body, the body having a density of from about 0.2 pound per cubic foot to about 1.5 pound per cubic foot, the steps of the method comprising providing a plurality of heat expandable synthetic resinous particles, the particles forming a gel when placed in a solvent for an uncrosslinked composition of generally like monomeric constitution, the particles having a swelling factor of at least 20 and a crosslinking coefficient of from about 0.8 to about 2.5 with the further limitation that the particles on heating to a temperature above the glass transition temperature of the polymer expand to at least 40 times their original volume at ambient temperature and on being pressurized at a pressure of at least 3 atmospheres in air for a period of 24 hours be capable of two-fold expansion when subjected to the conditions employed to expand the particles to at least 40 times their original volume; expanding said particles; disposing said particles within a closed mold; heating said particles to a temperature sufficient to cause further expansion of said particles and to cause adjacent particles to fuse together to form a unitary body which is thermocollapse resistant and resilient.

Also contemplated within the scope of the present invention is a coherent unitary foamed body of twice-expanded particles in closely adjacent relationship to each other, the adjacent particles being fused together to thereby provide a molded shaped article having a density of from about 0.2 pounds per cubic foot to about 1.5 pounds per cubic foot, beneficially the density being from about 0.2 to 1 pound per cubic foot and advantageously from about 0.2 to 0.75 pound per cubic foot.

Also contemplated within the scope of the present invention is a method for the preparation of coherent foamed bodies in accordance with the present invention having a density of from about 0.2 pound per cubic foot to about 1.5 pounds per cubic foot and advantageously from about 0.2 to 0.75 pound per cubic foot, such bodies being resilient and generally nonbrittle; the steps of the method comprising providing a plurality of the hereinbefore described expanded particles, filling a mold with said expanded particles, closing said mold, confining said expanded particles, heating said expanded particles contained within said mold to a temperature of from about 20 degrees centigrade to about 60 degrees centigrade above the glass transition temperature of the polymer of said particles to thereby cause further expansion of said particles and to cause adjacent particles to fuse together to form a unitary body which is resilient. By the term resilient is meant that a generally spherical or rectangular particle or article in accordance with the present invention can be compressed between two opposing flat surfaces to 10 percent of an original dimension at a temperature of 23° centigrade for 10 seconds and on removal of the compressing force from the particle or article, the particle or article will reexpand within a period of about 10 seconds to at least about 80 percent of its original dimension before compressing.

In selecting suitable polymers for the practice of the present invention, the swelling factor is of great importance. The swelling factor is determined by immersing a lightly crosslinked polymer in a solvent for the uncrosslinked polymer. Preferably, the polymer and solvent each have similar, if not identical, solubility parameters. Such immersion may take place at atmospheric pressure and ambient or elevated temperatures below the boiling point of the solvent. Generally, such an immersion is made employing ambient temperature for both solvent and polymer. When equilibrium swelling is reached, the weight of the unswollen polymer is divided into the weight of the swollen polymer to provide the swelling factor. In such a determination, sufficient solvent is provided that when equilibrium is reached, two phases are clearly obvious. If the polymer completely dissolves in the solvent, the polymer is unsuitable for the practice of the present invention. When the crosslinking coefficient of the polymer is in a higher range, a relatively stiff and formed gel is obtained, that is a gel in solvent tends to replicate the general configuration of the particle which has been immersed in the solvent. In the lower range of crosslink density, a formless gel is obtained. Any tendency to replicate the configuration of the immersed particle is lost. However, two distinct phases exist; the solvent phase and the solvent swollen polymer phase. Conveniently, the gel can be separated from the solvent phase by carefully pouring the contents of the vessel employed to contain the solvent and polymer onto a screen, such as 50 mesh U.S. sieve size screen, the gel being retained on the screen while the solvent passes through. The solvent is removed from the bottom part of the screen, such as by wiping with a paper towel, and the weight of the gel on the screen determined. The ratio of the weight of the gel to the weight of the unswollen particle is the swelling factor. Very desirable expandable particles in accordance with the present invention are obtained when the swelling factor is from about 20 to about 35.

The crosslinking coefficient is a well known value to those skilled in the art of polymer chemistry and is indicative of the number of crosslinks per weight average molecular weight. The crosslinking coefficient of polymer is discussed at length in *Atomic Radiation and Polymers* by A. Charlesby, Pergamon Press, New York, 1960, pages 140–145. A particularly convenient means for calculating crosslinking coefficient Z when styrene and divinylbenzene are employed is by the use of the following equation:

$$Z = \frac{Mw}{\frac{\text{Moles of styrene} \times 104.14}{\text{Moles of divinylbenzene}}}$$

wherein Mw is the weight average molecular weight of polystyrene obtained under identical polymerization conditions but without divinylbenzene. The assumption is made that the divinylbenzene forms only crosslinks, and that it is 100 percent efficient. As varying crosslinking agents are employed, not all are of equal efficiency.

Expandable particles in accordance with the present invention may be prepared from a wide variety of monovinyl monomeric materials which are subject to addition polymerization. An essential feature of the material from which articles in accordance with the present invention may be prepared is that monomeric materials employed undergo addition polymerization to form a thermoplastic polymer in the presence of an appropriate amount of crosslinking agent, provide a crosslinking coefficient of from about 0.8 to about 2.5 and beneficially from about 1.0 to 2.25; advantageously from about 1 to 1.5. It is critical to the preparation of particles and articles in accordance with the present invention that the base weight average molecular weight be equal to or in excess of 150,000 grams per mole. By the term base weight average molecular weight is meant the weight average molecular weight of an addition polymer polymerized under conditions identical to that employed in the preparation of crosslinked polymers in accordance with the present invention without a crosslinking agent.

In the preparation of expandable particles in accordance with the present invention, it is generally desirable to conduct a polymerization of the selected monomer system under approximate polymerization conditions in the absence of a crosslinking agent, subsequently determining the weight average molecular weight of the resultant polymer. If the weight average molecular weight of the resultant polymer is 150,000 grams moles or greater, conditions are suitable for the preparation of expandable particles in accordance with the present invention when the polymerization is conducted in the presence of an appropriate quantity of crosslinking agent. Suitability for the preparation of particles in accordance with the present invention may be readily confirmed by determining the crosslinking coefficient as hereinbefore set forth.

A particle or plurality of particles of the crosslinked polymer are weighed, subsequently immersed in a solvent for the uncrosslinked polymer at ambient temperature (about 23° centigrade) and the particles permitted to swell until equilibrium is reached, that is the maximum degree of swelling is obtained. The solvent swollen polymer hereinafter referred to as gel is then weighed and the weight of the gel is divided by the weight of the unswollen polymer providing a ratio referred to as the swelling factor. Suitable polymers for the present invention are obtained when the swelling factor is 20 or greater.

A wide variety of monomers may be employed alone or in combination in the preparation of expandable particles in accordance with the present invention. The major portion of the monomers utilized for the preparation of particles and articles in accordance with the present invention are monovinyl compounds which undergo addition polymerization to provide generally linear polymers, and are capable of forming crosslinked structures when polymerized in the presence of a crosslinking quantity of a polyvinyl compound, such as for example, ethylene glycol dimethacrylate, divinylbenzene and the like. Monovinyl compounds include by way of representative example and not by limitation, such monomeric materials as styrene, vinyltoluene, all of the three isomers, paravinyltoluene being preferred, chlorostyrenes, both mono and polychlorostyrenes, bromostyrenes, and the like, which form linear polymers in the absence of a crosslinking agent. Minor quantities, that is less than about 15 weight percent of other monomers such as ethylstyrene, tertiarybutylstyrene, methylacrylate, methylmethacrylate, acrylic acid, acrylonitrile, and the like may be copolymerized with styrene and/or the substituted styrenes hereinbefore set forth. The choice of the particular monovinyl materials employed in the practice of the present invention will depend primarily on the ready availability of such material and the physical properties desired in the resultant product.

A wide variety of crosslinking agents may be employed in the practice of the present invention, such crosslinking agents include as nonlimiting exemplification the following materials: divinylbenzene, diethylene glycol dimethacrylate, diisopropenylbenzene, diisopropenyldiphenyl, diallylmaleate, diallylphthalate, allylacrylates, allylmethacrylates, allylfumarates, allylitaconates, alkyd resin types, butadiene or isoprene polymers, cyclooctadiene, methylene norbornylenes, divinyl phthalates, vinyl isopropenylbenzene, divinyl biphenyl, as well as any other di- or poly-functional compound known to be of use as a crosslinking agent in polymeric vinyl-addition compositions. Also useful for obtaining the desired degree of crosslinking is high energy ionizing radiation and free radical generating peroxides.

The efficiency of such crosslinking materials oftentimes is affected by other materials present in the polymerization system. Thus, the particular quantity of the crosslinking monomeric material utilized in the preparation of particles in accordance with the present invention can vary within wide limits depending on the specific composition of the mixture of the monomeric materials being polymerized and the nature of the initiators used in the promotion of such polymerization. By way of a nonlimiting illustration, in the polymerization of styrene to form particles in accordance with the present invention, utilizing benzoyl peroxide as a primary free radical polymerization initiator and divinylbenzene as the crosslinking agent and tertiary butyl peroxy benzoate as a secondary initiator, polymers having a like swelling factor may be prepared using various levels of benzoyl peroxide; but in order to obtain a like swelling index the quantity of divinyl benzene must be increased as quantity of benzoyl peroxide is increased, wherein all other polymerizations quantities and conditions are maintained constant. Thus suitable polymers for use in the practice of the present invention having generally identical physical properties insofar as swelling index and expansions are concerned, may be obtained under a variety of conditions, the polymerization rate may be controlled to obtain a rate which is particularly suitable for the polymerization equipment at hand. In the event that the polymerization equipment offers option of a high heat transfer rate, the polymerization may be conducted at a higher rate of conversion than if equipment were employed which permitted only a relatively low rate of heat transfer. Such polymerizations are generally of an exothermic nature. Removal of the heat of polymerization is generally necessary to obtain a polymer having a desired weight average molecular weight between crosslinks. Particular polymerization conditions, crosslinker concentration and like variables are readily determined by anyone with minimal skill in the art of addition polymerization, with addition polymerizable monomeric materials.

Many primary blowing agents may be employed in the practice of the present invention. Generally, such blowing agents are low boiling organic compounds and include such materials as dichlorodifluoromethane, pentafluorochloroethane, dichlorotetrafluoroethane, butane, isobutane, isopentane, neopentane, 2,3-dimethylbutane, and the like. A critical characteristic that the primary blowing agent must possess is that the diffusion rate of the primary blowing agent through polymeric cell walls of an expanded particle is less than the diffusion rate of an inert nonorganic secondary blowing agent, such as steam, air, nitrogen, and the like. Blowing agents may be employed alone or as a mixture of blowing agents. There are two principle methods for the incorporation of the primary blowing agent within the expandable particles. These two methods may be referred to as the "polymerize in" or "steep in" methods. Employing the polymerize in method, the primary blowing agent is admixed with the monomeric material prior to polymerization into expandable particles in accordance with the invention. On polymerization of the monomeric material, the primary blowing agent is generally uniformly distributed within such particles and the product of the polymerization is an expandable bead in accordance with the present invention. The second process, or steeping-in process requires the formation of the polymer particle prior to the addition of the primary blowing agent. Such a steeping-in process may be accomplished by the addition of a primary blowing agent during or on completion of the suspension polymerization step. For example, when the polymerization is partially complete, by way of nonlimiting illustration when at least about one-half of the monomer has been converted to polymer, the primary blowing agent may be added to the reactor. The primary blowing agents are organic in nature. They are preferentially incorporated into the polymer particles rather than in the suspending water phase employed for the suspension polymerization. Alternatively, to the aqueous steep-in process is the so called dry process, wherein after polymerization of the monomeric material in the polymer particles is complete insofar as practical purposes are concerned, the particles may be coated with an anticlumping agent, often a silicaeous material, for example, a finely divided particulate clay, the particles and primary blowing agent enclosed within a vessel, stored therein for a sufficient length of time to permit the primary blowing agent to swell the polymerized particle. Advantageously, such a dry steeping-in process may be conducted at any temperature below that at which the particles exhibit a significant tendency to adhere to each other, such temperature being dependent in part upon the glass transition temperature of the polymer. Any coating such as particulate clay which has been applied to the particles to prevent agglomeration thereof, during the steeping operation, may or may not be removed by appropriate washing after impregnation with blowing agent.

The first or primary expansion of particles in accordance with the present invention is readily accomplished employing techniques well known in the art, such as exposing the particles to hot air or steam at atmospheric pressure, subatmospheric pressure or superatmospheric pressure, depending on the particular polymer utilized and the glass transition temperature of such a polymer. In the event that styrene is utilized as the principle monomeric component in the preparation of particles in accordance with the invention, steam is sufficient to cause the first expansion of the particles to a volume approximating that of the volume of the volatile fluid blowing agent contained therein which would be expected at the temperature of expansion. Alternatively, such particles may be first expanded by exposure to heated inert gas such as air, nitrogen or the like which is nonreactive with the polymer under conditions of expansion. Such expansion may occur in an oven or an expander designed specifically for expandable particles. Alternativley, such an expansion may take place by immersing the particles in a heated liquid for example, hot water. After the initial or primary expansion of particles in accordance with the invention the particles may be aged with or without cooling in a gas such as air, nitrogen, or the like which has a permeability rate through the cell walls of the polymer greater than the permeability rate of the primary blowing agent through the cell walls of the foamed particles. Generally, on heating in such an inert atmosphere, the particles have a tendency to expand even further. When the desired degree of expansion is obtained in the primary expansion, the particles alternatively may be cooled to room temperature, or at least below the glass transition temperature of the polymer and subjected to inert gas at superatmospheric pressure. Generally, on applying superatmospheric pressure to the particles at room temperature, shrinkage occurs wherein the cell walls of the particles tend to wrinkle somewhat. Such particles are often referred to as "raisin-like". Alternatively, particles in accordance with the present invention, may be subjected to superatmospheric pressure at their expansion temperature until the inert gas has diffused into the particles to the desired degree. Reduction of the pressure on the particles to either atmospheric pressure or subatmospheric pressure results in further or secondary expansion of the particles by a factor of at least 2 volumes. The first alternative route to expanding the particles after the first expansion wherein the particles have been cooled to room temperature and pressurized with an inert gas, they may be subsequently heated to provide a second expansion wherein a substantial increase in the ratio of foam volume to solid volume is obtained. In the initial expansion, generally the ratio of the foam volume to the solid volume is in the range of about 20 to 120 and desirably is in excess of 40. Generally, employing the technique of the secondary expansion, that is, the inducing diffusion of inert gas into the cells, results in a particle which on heating to a temperature of from about 20 to 60 degrees centigrade above its glass transition temperature results in particles having a foam volume to solid volume ratio of from about 80 to as much as about 500. The degree of expansion desired in the secondary expansion is dependent on the end use intended for the particles being employed. In the event that they are utilized as loose fill dunnage, maximum expansion generally can be tolerated if the dunnage is to be employed with articles of relatively low density. If the particles are to be employed for molding shaped articles, generally less than maximum expansion is desired in that additional expansion in the mold is required to obtain a solid generally gas and liquid impermeable body.

Desirable low density particles can be obtained by prolonged heating at atmospheric pressure in air or by heating for very short periods at subatmospheric pressure and subsequently allowing the particles to reinflate at atmospheric pressure. A plurality of volatile organic blowing agents were evaluated for the preparation of particles and articles in accordance with the present invention. Such blowing agents included dichlorodifluoromethane, trichlorofluoromethane, dichlorotetrafluoroethane, trichlorotrifluoroethane, butane, isobutane, pentane, isopentane, neopentane, 2,3-dimethyl butane, and the like, were found to provide desirable performance as primary blowing agents in lightly cross-linked particles in accordance with the present invention.

In preparation of moldings in accordance with the present invention, generally it is desirable to employ particles which have been pressurized with an inert gas such as nitrogen, air, or the like. Due to the permeability of the cell walls of the particles to the secondary blowing agent, it is desirable to transfer the pressurized moldable particles rapidly into the mold and heat the particles to a desired molding temperature without undue delay. Inert gas diffuses into the particles fairly readily under superatmosphereic pressure and when the particles are returned to atmospheric pressure, the inert gas will diffuse from the particles. Depending upon the temperature and conditions, such diffusion from the particles may take place in a matter of minutes or an hour or two. Therefore, in order to obtain maximum benefit from the pressurizing step, rapid molding of the particles after depressurization is desirable. Temperatures employed in the molding of particles in accordance with the present invention, are generally commensurate with those employed in the molding of higher density articles, which are normally obtained from conventional expandable synthetic resinous particles. For most purposes, particles in accordance with the present invention are generally spherical in nature. Such spherical particles may be prepared by suspension polymerization of an appropriate monomer and primary organic blowing agent in aqueous suspension in the presence of appropriate catalysts or polymerization initiators. Alternatively, particles may be obtained by the extrusion of strands of circular or other cross-sectional configuration, cutting the strands into short lenghs, short lengths meaning particles having a length approximating the maximum cross-sectional dimension of the strand; for example, cylinders having a length of from one-half to two and one-half times the diameter of the strand. Such particles generally may be dispersed in an inert dispersing medium, such as water, and heated above the glass transition temperature of the polymer, whereupon the surface tension forces the elongate particles to assume a generally spherical configuration. Such particles may or may not contain the organic volatile blowing agent. If such particles contain the volatile fluid foaming agent, such heating is generally done under pressure. Alternatively, the particles may be impregnated with the volatile fluid foaming agent while simultaneously being heated to provide particles having the desired spherical configuration.

Oftentimes in the preparation of synthetic resinous thermoplastic dunnage materials, a configured ribbon of material may be extruded. For example, such a ribbon may have a tri-lobal configuration or an S-shaped configuration, the extruded strand being rapidly quenched in a cooling medium, for example, cold water; so that on extrusion the ribbon containing the volatile fluid foaming agent does not foam or expand, and the ribbon is severed into short lengths which may subsequently be expanded through a primary expansion step and a secondary expansion step in the manner hereinbefore described to provide low density desirable dunnage materials.

In the practice of the present invention, various tests may be performed which simplify the determination of the suitability of a specific combination of a particular crosslinked density polymer, expansion agent and foaming conditions which provide a convenient route to a desirable expandable particle without the necessity of taking more difficult analytical steps. It is essential and critical to the practice of the present invention that the volatile fluid organic blowing agents employed in what may be considered a lightly crosslinked polymer have a diffusion rate through the polymer which is substantially less than the diffusion rate of air, nitrogen or other conveniently available gaseous material through the polymer. As the expandable particles in accordance with the present invention achieve their highly desirable low density, most often by means of sequential expansion steps, it is desirable that the volatile fluid organic foaming or blowing agent preferentially remain within the polymer, that is, blowing agent loss from the particle be relatively low. Generally, on the initial expansion of an expandable particle in accordance with the present invention, primary blowing or primary expansion is caused by the vaporization of the volatile fluid organic blowing agent when the polymer is held at a desired heat plastifying temperature for a relatively short period of time; for example, less than 30 minutes, and beneficially less than 10 minutes, and desirably less than 5 minutes. A very useful evaluation procedure for identifying desirable polymer blowing agents which may be single compounds or combinations thereof, is hereinafter set forth wherein the temperatures and pressures are related particularly to styrene polymers. It should be recognized by those of minimal skill in the art that some deviation in temperatures and pressures and variation of blowing agents will require modifications of the conditions hereinafter set forth. Such modified conditions are readily selected by those knowledgable in the art of synthetic resinous thermoplastic foams. A critical factor to the performance of expandable particles in accordance with the present invention is so-called secondary foaming response; the secondary foaming response being a measure of the expansion of an expanded particle when exposed to conditions such that a second expansion may be obtained. In order to evaluate the performance of a particular volatile organic blowing agent, whether such blowing agent be a single chemical compound or mixtures thereof, the following steps are found to provide a convenient and rapid route wherein the specific temperatures, times and the like are exemplary of styrene polymer particles of about 1 millimeter average diameter.

Step 1

Beneficially, a particle, believed to be in accordance with the particles of the present invention, which is crosslinked to the required degree and contains volatile fluid foaming agent, is heat plastified by heating at a temperature of from about 110° centigrade to about 150° centigrade to provide once foamed particles. Most advantageously a temperature of 130° centigrade may be employed and by causing an initial expansion or foaming of the particle to obtain an expansion ratio of from about 45 to 50 volumes; the expansion ratio being the ratio of the initially expanded foam to the volume of the solid unfoamed particle, and can be expressed as $$ER = \frac{\text{Volume of Foam}}{\text{Initial Solid Volume}} = V_f/V_s \quad \text{(Equation I)}$$

Step 2

When Step 1 has been completed and an expansion ratio of preferably about 50 is attained, the particles under evaluation are cooled and permitted to age in air at room temperature and ambient atmospheric pressure for a period of about 4 to 24 hours. Step 2 may be considered as a first or primary aging step.

Step 3

The particles obtained in Step 2 are exposed to a gas under pressure such as air or nitrogen; most advantageously air at a pressure of about 50 pounds per square inch gauge for a period of 20 hours plus or minus 30 minutes at room temperature. By room temperature is meant a temperature approximating 23° C. On the completion of Step 3, the gas pressure inside the foam particles will generally be equal to the external gas pressure applied to the particles. More preferably stated, $P_i$ the internal pressure and $P_o$ the external pressure will be approximately equal.

Step 4

The gas pressure on the pressurized particles obtained in Step 3 is decreased to ambient atmospheric pressure; thus the applied pressure to the particles will be equal to atmospheric pressure, and the internal pressure within the foamed and pressurized particles will approximate to a very close degree the applied pressure in Step 3.

Step 5

Samples of the pressurized particles from Step 4 are heated in air at a temperature of about 130° C. for periods of 1, 3 and 5 minutes to provide twice foamed particles. Such heating should be done within 3 minutes of reducing the applied pressure employed in Step 3 to atmospheric pressure as in Step 4. After heating for the various periods of time specified, the resultant samples of particles are cooled to ambient temperature, and density of the particles are measured beneficially by water displacement. For convenience, the density of the polystyrene may be considered to be 1, although the actual value is 1.045 grams per cubic centimeter.

Step 6

A secondary foaming ratio is determined by dividing the volume of the twice-foamed particle by the volume of the once foamed particle to thereby determine a secondary foaming ratio (SFR). As particles have been heated for periods of 1, 3 and 5 minutes, three usually different secondary foaming ratios are obtained. For convenience, these may be designated as SFR-1, SFR-3, and SFR-5. Generally, wherein if any one of these ratios has a value greater than 4, the particles are considered to be excellent. If any one of the secondary foaming ratios obtained is within the ratio of about 3.5 to 4, the particles can be considered to be very good. If any one of the secondary foaming ratios lies between 3 and 3.5, the particles are classed as good. If the secondary foaming ratio is between about 2 and 3, the particles may be considered fair to marginal. The secondary foaming ratio employed in the foregoing evaluation or rating is the maximum of SFR-1, SFR-3 or SFR-5 whichever exhibits the greatest ratio. In the event that none of the secondary foaming ratios as determined at 1, 3 and 5 minutes is greater than 2, the particles generally are unsatisfactory.

Of great advantage in selecting a desirable volatile fluid foaming agent for use in the practice of the present invention is the relationship between the solubility parameter of the polymer and the blowing agent employed. The solubility parameter is readily approximated employing Equation II:

$$\delta_s = \left( \frac{\Delta H_{25} - RT}{V} \right)^{0.5} \quad \text{(II)}$$

wherein $\delta_s$ is the solubility parameter of the blowing agent, wherein $\Delta H_{25}$ is the molar heat of the vaporization at 25° C. expressed in calories per gram mole. R is the gas constant conveniently taken as 1.98. T is the absolute temperature and V is the molar volume in cubic centimeters per gram mole. The molar heat of vaporization $\Delta H_{25}$ is approximated by Equation III:

$$\Delta H_{25} = 23.7\, T_b + 0.02\, T_b^2 - 2950 \quad \text{(III)}$$

wherein $T_b$ is the boiling point in degrees Kelvin. The solubility parameter of the polymer can be calculated from the molar attraction constants in accordance with the teaching of J. Brandrup and E. H. Immergut, IV 366, John Wiley & Sons, 1966, which generally states that maximum solubility of a polymer is observed when the energy of vaporization per unit volume of the polymer and solvent are equal. A convenient value for the solubility parameter of polystyrene is 9.1 as set forth in *Encyclopedia of Polymer Science & Technology*, Volume 13, page 252, John Wiley & Sons, 1970. When the volatile fluid organic blowing agent is a mixture, the solubility parameter is calculated assuming a simple additivity of the product of the solubility parameter of each solvent multiplied by the mole fraction thereof in the blowing mixture. Where the primary foaming ratio is equal to or greater than 50 and the absolute difference between the solubility parameter of the polymer and the volatile fluid foaming agent is equal to or greater than 2.5, and the secondary foaming ratio is equal to or greater than 2.5 under the conditions hereinbefore set forth provides desirable foam particles. Preferably, the secondary foaming ratio is equal to or greater than 3.5.

In order to obtain a suitable foam, volatile blowing agents are employed which exhibit a minimal tendency to cause craze formation or cracking, or openings in the cell walls. When particles are depressurized as in Step 4, the stress of the cell walls is approximated by Equation IV:

$$\sigma_{cw} = \Delta P \cdot 1.5\, ER \quad \text{(IV)}$$

wherein $\sigma_{cw}$ is the stress in the cell wall in pounds per square inch; $\Delta P$ is the difference in pressure inside the foam cells and the pressure external to the particles, and ER designates the expansion ratio. Typical values for stress in the cell walls wherein P is 44 pounds per square inch and expansion ratios of 40, 50 and 60 are obtained, result in stresses of 2,640, 3,300 and 3,960 pounds per square inch, respectively. As the particles in accordance with the present invention produce foams of very low density, the cell walls are thin relative to most commercially available thermoplastic resinous foams. Oftentimes, such wall thicknesses are in the order of 1,000 to 10,000 angstroms in thickness. In the event that crazing or a tendency to crack in the cell walls occurs before secondary expansion, the secondary foaming ratio will be undesirably low.

The FIGURE depicts the relationship between the difference in solubility parameters and secondary foaming for several common blowing agents, including isobutane, normal butane, normal pentane, isopentane, dichlorodifluoromethane, trichlorofluoromethane and 1,1,2-trichloro 1,2,2-trifluoroethane.

Table I sets forth a variety of compounds together with their boiling point in degrees centigrade, density, solubility parameters and the difference in solubility parameters between polystyrene and the blowing agent.

TABLE I

| | | | Solubility Parameters | | |
|---|---|---|---|---|---|
| Compound | Formula | B.P.* °C. | Density gm cm$^{-3}$ | $\delta_s{}^a$ | $\delta_p - \delta_s{}^b$ |
| Perfluoromethane | $CF_4$ | −128 | | 2.1 | |
| Chlorotrifluoromethane | $CF_3Cl$ | −85 | | 4.4 | 4.7 |
| Dichlorodifluoromethane | $CF_2Cl_2$ | −29 | 1.31 | 6.1 | 3.0 |
| Trichlorofluoromethane | $CFCl_3$ | +24 | 1.47 | 7.5 | 1.6 |
| Carbon Tetrachloride | $CCl_4$ | +76 | 1.59 | 8.5 | 1.0 |
| Perfluoroethane | $C_2F_6$ | −80 | 1.29 | 4.1 | 5.4 |
| Chloropentafluoroethane | $C_2F_5Cl$ | −38 | 1.38 | 5.2 | 3.9 |
| Dichlorotetrafluoroethane | $C_2F_4Cl_2$ | +3.6 | 1.46 | 6.25 | 2.85 |
| Trichlorotrifluoroethane | $C_2F_3Cl_3$ | +47 | 1.56 | 7.3 | 1.8 |
| Perfluoropropane | $C_3F_8$ | −38 | 1.47 | 5.2 | 3.9 |
| Chloroheptafluoropropane | $C_3F_7Cl$ | −4 | 1.55 | 5.7 | 3.4 |
| Dichlorohexafluoropropane | $C_3F_6Cl_2$ | +32 | 1.59 | 6.4 | 2.7 |
| Perfluorobutane | $C_4F_{10}$ | 0 | 1.57 | 5.25 | 3.85 |
| Chlorononafluorobutane | $C_4F_9Cl$ | +29 | 1.62 | 5.8 | 3.3 |
| Perfluorocyclobutane | $C_4F_8$ | −5 | | 6.08 | 3.02 |
| Methane | | −161.6 | | $6.8^{-161**}$ | |
| Ethane | | −89 | $0.546^{-88**}$ | $7.6^{-89}$ | |
| Propane | | −42 | $0.585^{-44}$ | $6.0^{25}$ | 3.1 |
| Cyclopropane | | −33.5 | $0.615^{15.6}$ | $6.95^{25}$ | 2.15 |

TABLE I-continued

| Compound | Formula | B.P.* °C. | Density gm cm$^{-3}$ | $\delta_s{}^a$ | $\delta_p - \delta_s{}^b$ |
|---|---|---|---|---|---|
| Butane | | −0.5 | 0.579$^{20}$ | 6.7$^{25}$ | 2.4 |
| Isobutane | | −11.7 | 0.557$^{20}$ | 6.25$^{25}$ | 2.85 |
| Pentane | | 36.1 | 0.626$^{20}$ | 7.05$^{25}$ | 2.05 |
| Isopentane | | 27.7 | 0.621$^{19}$ | 6.75$^{25}$ | 2.35 |
| Neopentane | | 9.7 | 0.613$^{20}$ | 6.25$^{25}$ | 2.85 |
| Cyclopentane | | 49.2 | 0.805$^{19}$ | 8.45$^{25}$ | 0.65 |
| Hexane | | 68.7 | 0.659$^{20}$ | 7.3$^{25}$ | 1.8 |
| Neohexane | | 49.7 | 0.649$^{20}$ | 6.8$^{25}$ | 2.3 |

$^a\delta_s$ is calculated from Equation II at 25° C. unless otherwise noted.
$^b\delta_p$ is the solubility parameter of polystyrene, 9.1 polymers of styrene with small amounts of divinylbenzene are considered to have the same $\delta_p$ value as pure polystyrene.
*B.P. °C. = Boiling point degrees centigrade at atmospheric pressure.
**Superscript indicates temperature in degrees centigrade.

By way of further illustration, a mixture of 75–25 parts by weight of dichlorodifluoromethane and trichlorofluoromethane provides a mixture having 0.775 mole fraction of the difluoro compound and 0.225 of the monofluoro compound. Therefore, the following relations are believed valid:

$$\delta_{VOBA\ mixt} = (0.775 \cdot 6.1) + (0.225 \cdot 7.5)$$
$$= 6.415$$

The $\delta_p - \delta_{VOBA\ mixt} = 9.1 - 6.415 = 2.685$ wherein VOBA = Volatile Organic Blowing Agent. Thus, a mixture of the two materials provides a useable blowing agent mixture although not the most desirable. In the case of polystyrene, a number of desirable mixtures of hydrocarbons with dichlorodifluoromethane provide particles with very desirable secondary foaming ratios in polystyrene such as:

| | $\delta_{VOBA}$ Mixture | $\delta_p - \delta_{VOBA}$ |
|---|---|---|
| 6.1% isopentane + 13.3% CF$_2$Cl$_2$ | 6.38 | 2.72 |
| 4.9% isobutane + 13.9% CF$_2$Cl$_2$ | 6.16 | 2.94 |
| 5.9% n-pentane + 15.1% CF$_2$Cl$_2$ | 6.48 | 2.62 |
| 5.3% n-butane + 13.8% CF$_2$Cl$_2$ | 6.37 | 2.73 | all percentages being by weight; the remainder being lightly crosslinked polystyrene.

The invention is further illustrated but not limited by the following examples:

EXAMPLE 1

A plurality of spherical polymer particles having an average diameter of 1.53 millimeters are prepared by suspension polymerization employing the following composition:

| | |
|---|---|
| Styrene | 99.65 parts by weight |
| Divinylbenzene | 0.04 part by weight |
| Ethylvinylbenzene | 0.01 part by weight |
| Benzoyl peroxide | 0.2 part by weight |
| Tertiarybutyl peroxybenzoate | 0.1 part by weight |

100 parts by weight of the foregoing mixture was dispersed in 300 parts by weight of water which contained 0.2 part by weight of methylcellulose as a suspending agent, the parts by weight of methyl cellulose being based on the total quantity of water. The dispersion was agitated and heated to a temperature of 80 degrees centigrade for a period of 20 hours. Polymerization was completed by raising the temperature of the suspension to 95 degrees centigrade for an additional 10-hour period. When the foregoing procedure is repeated without the divinylbenzene and ethylvinylbenzene, polystyrene is obtained having a weight average molecular weight of 373,000 grams per mole as determined by gel permeation chromatography. The swelling factor of the styrene divinylbenzene copolymer was determined by immersing particles of the resulting suspension in toluene for a period of 24 hours at a temperature of about 25 degrees centigrade. The swelling factor was determined to be about 30, the swelling factor being the weight of the swollen gel divided by the weight of the unswollen particle. The crosslinking coefficient calculated in the hereinbefore described manner was 1.15. A portion of the crosslinked polymer particles was coated with submicron Kaolinite clay sold under the trade designation of Ajax Jigger P from Georgia Kaolin Co. 9.8 grams of the crosslinked styrene polymer were coated with 1.96 grams of clay by shaping the polymer particles with the clay. The clay coated particles were placed in a glass ampule having a volume of 34.5 cubic centimeters together with 5 cubic centimeters of a mixture of three parts by weight of dichlorodifluoromethane and one part by weight of trichlorofluoromethane. The glass ampule was sealed and placed in a water bath which was maintained at a temperature of about 80 degrees centigrade. The ampule was rotated end-over-end at a rate of about 10 revolutions per minute for a period of 66 hours. The temperature of the ampule ranged from an initial temperature of room temperature to 80 degrees centigrade. The ampule and contents were subsequently cooled in dry ice and recovered polymer beads were stored at a temperature of −20 degrees centigrade. Six experiments were carried out in this manner wherein the pressurization temperature varied from about room temperature to about 80 degrees centigrade and the pressurization time for five of the samples was 66 hours and for one of the samples was 16 hours. The results are set forth in Table II.

TABLE II

Preparation of Expandable
Particles by Impregnation
1.53 mm Styrene-co-0.04% Divinylbenzene Beads
with 75/25 CF$_2$Cl$_2$/CFCl$_3$ Mixture

| No. | Pressurization Temp. (°C.) | Pressure in Ampoules psia (est.) | Pressurization Time (hours) | % VOBA* in EP |
|---|---|---|---|---|
| 1 | 21–24 | 70 | 66 | 20.8 |
| 2 | 40 | 120 | 66 | 28.9 |
| 3 | 50 | 150 | 66 | 28.6 |
| 4 | 60 | 180 | 66 | 27.9 |
| 5 | 80 | 280 | 66 | 28.7 |

TABLE II-continued

Preparation of Expandable
Particles by Impregnation
1.53 mm Styrene-co-0.04% Divinylbenzene Beads
with 75/25 $CF_2Cl_2/CFCl_3$ Mixture

| No. | Pressurization Temp. (°C.) | Pressure in Ampoules psia (est.) | Pressurization Time (hours) | % VOBA* in EP |
|---|---|---|---|---|
| 6 | 80 | 280 | 16 | 28.7 |

*This value is based upon the weight loss of EP particles heated for 1 hour in 175° C. air.

The following abbreviations have been employed in the foregoing table: Temp refers to temperature; psia to pounds per square inch absolute; est corresponds to estimated; % VOBA refers to weight percent of volatile organic blowing agent; and EP refers to crosslinked expandable polystyrene particles.

The foamability of Samples 1 through 6 as set forth in Table II was determined by placing portions of the blowing agent impregnated beads in a hot air oven having an internal temperature of 130 degrees centigrade. The beads were placed in 57 millimeter diameter 0.10 millimeter thick aluminum foil weighing dishes. After various time intervals at 130 degrees centigrade, the expanded crosslinked expandable polystyrene particles were removed from the oven and the expansion ratio determined. By the expansion ratio is meant the volume of the foam particle divided by the volume of the particle prior to foaming. The density and volume of the foamed particles were determined by measuring their buoyancy in water at room temperature. The foaming characteristics of Samples 1 through 6 under various conditions are set forth in Table III.

TABLE III

Expansion of EP Particles From
Table II in 130° C. Air
Foam Expansion Ratio After Indicated Time in 130° C. Air
$(V_f/V_s)$*

| No. | 15 sec | 30 sec | 1 min | 3 min | 10 min | 30 min | 1 hr |
|---|---|---|---|---|---|---|---|
| 1 | 25 | 25 | 37 | 59 | 89 | 106 | 47 |
| 2 | 24 | 32 | 52 | 79 | 135 | 211 | 205 |
| 3 | 20 | 36 | 50 | 77 | 130 | 217 | 229 |
| 4 | 25 | 32 | 46 | 69 | 133 | 212 | 202 |
| 5 | 25 | 35 | 44 | 80 | 142 | 209 | 218 |
| 6 | 27 | 34 | 48 | 85 | 150 | 220 | 220 |

*In Table III the abbreviation $V_f/V_s$ is the ratio of the volume of the foamed particle to the volume of the solid particle.

From Tables II and III it should be noted that Sample 1 had a significantly lower foaming ability primarily due to the lower volatile organic blowing agent concentration in the particle and at 30 minutes reached a maximum foam volume of the 106 times the volume of the initial particles. The remaining Samples 2–6 having generally equivalent volatile blowing agent contents exhibited generally superior foaming ability and reached volumes of somewhat over 200 times the volume of the initial particles. Maximum foam volumes reached by Samples 1–6 were in all cases greater than the theoretical volume that one would expect from merely the expansion of the volatile organic blowing agent. Sample 1 has about twice the volume that one would expect from expansion of volatile organic blowing agent only, whereas the other samples average about 2.97 times the volume expected from the primary blowing agent only. These samples exhibit the osmotic pressure foaming effect wherein the hot air permeates into the particle at a rate that is more rapid than the diffusion rate of the volatile organic blowing agent from the particle.

Subatmospheric foaming of portions of Samples 1–6 was conducted employing a glass thimble made from a tapered female 45/50 glass joint having a capacity of approximately 100 cubic centimeters. The glass tube was closed remote from the ground portion of the joint. The thimble was heated in a stainless steel beaker which had been heated in a hot air oven. The glass thimble was heated at 130° C. for a period of 25 minutes prior to dropping eight crosslinked expandable polystyrene polystyrene particles of a sample into it. Particles were permitted to foam at atmospheric pressure for varying periods of time. At the end of that time, a matching male joint was engaged with the thimble to provide a generally closed chamber connected to a 12 gallon vacuum tank by a three-way valve. The heated particles were foamed under a pressure of about 0.01 atmosphere for 25 to 30 seconds. When the foaming was complete, the thimble was removed from the oven and immersed into ice water for a period of about 25–30 seconds and the pressure was restored to 1 atmosphere absolute, the foam particles were recovered and the expansion ratio determined immediately after atmospheric pressure had been restored. The particles were permitted to remain in normal atmospheric pressure for about 24 hours and the expansion ratio again determined. The results are set forth in Table IV.

TABLE IV

Subatmospheric Expansion of EP 1–4
from Table II at 130° C.

| | Primary Foaming ($P_o$ = 1 atm abs) | | Subatmospheric Foaming ($P_o$ = 0.01 atm abs) $V_f/V_s$ Immediately After Restoring $P_o$ to 1 atm abs | Re-inflated* $V_f/V_s$ |
|---|---|---|---|---|
| No. | Minutes | $V_f/V_s$ | | |
| 1 | 1 | 50 | 65 | 172 |
| 1 | 3 | 90 | 102 | 285 |
| 2 | 5 | 115 | 105 | 325 |
| 3 | 7.5 | 136 | 125 | 405 |
| 4 | 10 | 158 | 150 | 430 |

*Foam particles after subatmospheric foaming are collapsed to a bellows-like structure or "raisin" when P is restored to normal atmospheric pressure. This column lists $V_f/V_s$ values after the particles have been exposed to air under 1 atmosphere at room temperature for 24 hours.

It is evident from Table IV that foamed particles of extremely low densities may be obtained employing techniques in accordance with the invention. Note that Sample 4 has been expanded to 430 times its initial volume.

A second series of foaming experiments were conducted wherein a reduced pressure within the thimble was varied from about 0.01 atmospheres absolute to about 0.4 atmosphere absolute.

Except as noted in Table V, conditions were generally as hereinbefore described for the foaming results set forth in Table IV.

TABLE V

Subatmospheric Expansion of EP 1–6 Under Variable $P_o$

| | Primary Foaming ($P_o$ = 1 atm abs) Minutes at 130° C. | $V_f/V_s$ | Subatmospheric Pressure Foaming | | Reinflated | |
| | | | $P_o$ (atm abs) | $V_f/V_s$ Immed. After Restoring $P_o$ to 1 atm abs | 24 hours $V_f/V_s$ | Foam Density pcf |
|---|---|---|---|---|---|---|
| No. | | | | | | |
| 1 | 3 | 93 | 0.01 | 100 | 310 | 0.2 |

TABLE V-continued

Subatmospheric Expansion of EP 1-6 Under Variable $P_o$

| No. | Primary Foaming ($P_o = 1$ atm abs) Minutes at 130° C. | $V_f/V_s$ | Subatmospheric Pressure Foaming $P_o$ (atm abs) | $V_f/V_s$ Immed. After Restoring $P_o$ to 1 atm abs | Reinflated 24 hours $V_f/V_s$ | Foam Density pcf |
|---|---|---|---|---|---|---|
| 2 | 3 | 91 | 0.06 | 103 | 297 | 0.21 |
| 3 | 3 | 90 | 0.13 | 98 | 280 | 0.22 |
| 4 | 3 | 89 | 0.2 | 90 | 245 | 0.25 |
| 5 | 3 | 91 | 0.26 | 94 | 200 | 0.31 |
| 6 | 3 | 96 | 0.33 | 98 | 170 | 0.367 |
| 7* | 3 | 92 | 0.4 | 98 | 130 | 0.48 |

*Comparative Sample 7 see description following Table VII.

As is evident from Table V, generally in order to obtain particles of minimal density, it is desirable that additional foaming or secondary foaming be accomplished at pressures less than about 0.25 atmospheres absolute.

Another method of secondary foaming of expandable crosslinked particles is demonstrated by the following experiment wherein the particles are exposed to an inert gas. Portions of particles from Samples 1-6 were heated for a period of 70 seconds in air at a temperature of about 130 degrees centigrade to produce foam particles having an expansion ratio of about 55. The expanded beads were cooled to room temperature and exposed to normal atmospheric pressure. Subsequently, the foam particles were subjected to nitrogen under a pressure of about 50 pounds per square inch gauge for various periods of time and the nitrogen uptake determined and the internal pressure within the foam particles calculated. The results are set forth in Table VI.

TABLE VI

Pressurization of 55 Volume EP 1-6 Beads With 50 psig $N_2$ at Room Temperature

| No. | Hours in 50 psig $N_2$ | $N_2$ Uptake* (gms $N_2$/100 cm³ CV) | Calc. $P_i$** (atms $N_2$ gauge) |
|---|---|---|---|
| 1 | 1 | 0.018 | 0.157 |
| 2 | 2 | 0.106 | 0.927 |
| 3 | 4 | 0.088 | 0.770 |
| 4 | 8 | 0.218 | 1.99 |
| 5 | 16 | 0.254 | 2.22 |
| 6 | 24 | 0.373 | 3.27 |

*$N_2$ uptake is expressed as grams of nitrogen per 100 cm³ of foam cell volume.
**$P_i$ internal pressure.

Expandable particles as set forth in Table VI immediately upon release of the nitrogen pressure were placed in an air oven at 130 degrees centigrade for variable time periods and the foam expansion volumes measured by the buoyancy test method after cooling to room temperature. Results are set forth in Table VII wherein the time indicated at the heads of columns indicates the time of exposure to 130 degrees air. By way of comparison, a sample of crosslinked expandable polystyrene (Sample 7) whose expansion ratio was 55, was maintained at atmospheric condition prior to reheating to 130 degrees, foamed to 74 volumes on exposure for 15 seconds to 130 degree air; on 30 seconds exposure 81 volumes. After 1 minute exposure, 86 volumes and on 3 minute exposure, 94 volumes; and 5 minute exposure, 98 volumes.

TABLE VII

Secondary Foaming of Pressurized 55 $V_f/V_s$ EP Foam Particles $V_f/V_s$ After Variable Time in 130° C. Air

| No. | 15 sec | 30 sec | 1 min | 3 min | 5 min |
|---|---|---|---|---|---|
| A-1 | 82 | 92 | 105 | 115 | 120 |
| A-2 | 103 | 113 | 120 | 131 | 135 |
| A-3 | 120 | 130 | 138 | 149 | 153 |
| A-4 | 143 | 150 | 162 | 174 | 180 |
| A-5 | 152 | 175 | 184 | 192 | 193 |
| A-6 | 176 | 190 | 195 | 200 | 201 |
| A-7 | 74 | 81 | 86 | 94 | 98 |

In order to illustrate the relative degree of stability or possibly instability of nitrogen pressurized crosslinked polystyrene foamed particles, a plurality of samples corresponding to Sample 6 in Table VII were pressurized under nitrogen at 50 pounds per square inch gauge for a period of about 24 hours. Portions of the resultant sample were permitted to remain at atmospheric pressure for different periods of time and subsequently foamed by exposure to hot air at a temperature of 130° C. for various periods of time, the results are set forth in Table VIII.

TABLE VIII

Secondary Foaming of Pressurized EP 6 Foam at Various Times After Removal from 50 psig $N_2$

| No. | Elapsed Time After Depressurization to $P_o = 1$ atm abs (hours) | $V_f/V_s$ After Variable Time Periods in 130° C. Air | | | | |
|---|---|---|---|---|---|---|
| | | 15 sec | 30 sec | 1 min | 3 min | 5 min |
| 6-1 | <0.1 | 176 | 190 | 195 | 200 | 201 |
| 6-2 | 0.25 | 150 | 163 | 172 | 181 | 187 |
| 6-3 | 0.5 | 128 | 143 | 150 | 163 | 170 |
| 6-4 | 1.0 | 118 | 126 | 132 | 145 | 152 |
| 6-5 | 2.0 | 108 | 110 | 114 | 123 | 126 |
| 6-6 | 4.0 | 76 | 84 | 88 | 95 | 100 |

From the data set forth in Table VIII, it is evident that it is desirable to expand the particles as soon as possible after depressurization. However, desirable foam volumes may be obtained after a considerable period of time. For optimum results, such a foaming should occur within about one-quarter of an hour after depressurizing the particles.

A plurality of particles of Sample No. 6 were heated for a period of one minute in air having a temperature of 130° C. The resultant foamed particles had a foam volume to solid volume ratio of 50. The resultant foamed particles were subjected to a pressure of 50 pounds were square inch gauge of nitrogen for a period of 41 hours. Portions of the pressurized foamed particles were heated for various periods of time in air having a temperature of 130° C. The external pressure on the particles was reduced to 0.265 atmospheres absolute for a period of 25 to 30 seconds prior to cooling to room temperature and restoring the external pressure on the particles to one atmosphere absolute. The resultant heating times and volume ratios obtained are set forth in Table IX.

TABLE IX

Secondary Foaming Under Subatmospheric $P_o$ at 130° C.

| No. | Secondary Foaming (Elapsed Time with $P_o$ = 1 atm abs) | $V_f/V_s$ | $V_f/V_s$ After Reducing $P_o$ to 0.265 Atm & Cooling (Fresh Foam) | $V_f/V_s$ After Reinflation in Air At Room Temp |
|---|---|---|---|---|
| 6-7 | 15 sec | 170 | 218 | 332 |
| 6-8 | 30 sec | 188 | 225 | 438 |
| 6-9 | 1 min | 202 | 230 | 451 |
| 6-10 | 3 min | 224 | 225 | 508 |

The data set forth in Table IX clearly indicates that relatively short expansion times can be obtained by pressurization of particles in the presence of inert gas.

EXAMPLE 2

A plurality of crosslinked polystyrene beads of generally uniform size were prepared by the suspension polymerization conditions generally commensurate with those employed in the preparation of Example 1. Monomer droplets were sized to produce 0.93 millimeter diameter lightly crosslinked copolymer beads employing as the monomer phase 99.65 weight percent styrene, 0.04 weight percent divinylbenzene, 0.01 weight percent ethylvinylbenzene, 0.2 weight percent benzoyl peroxide, and 0.1 weight percent tertiarybutylperoxy benzoate. The generally uniform sized spheroidal polymer beads were prepared employing a vertically mounted stainless steel column having a height of 2 meters and an inside diameter of about 1.5 centimeters. The column was filled with an aqueous solution of about 0.3 weight percent of a carboxymethylmethylcellulose as a suspending agent; the suspending medium, that is the aqueous solution of a carboxymethylmethylcellulose, was at a temperature of about 22° C. At the bottom of the column was an orifice plate having a diameter of about 3.8 centimeters and 9 openings of a diameter of about 0.4 millimeter and a land length of about 0.10 of a millimeter. The openings in the orifice plate were situated in the form of a square having 3 openings per side, with each of the openings being about 12 millimeters from the nearest adjacent opening. Beneath the orifice plate is a monomer reservoir connected to a monomer source. A column was provided with a suspending medium source in the form of a sidearm disposed about 5 centimeters above the orifice plate. A piston is disposed within the monomer reservoir in such a manner that the volume of the reservoir may be varied. The piston was connected to a variable frequency acoustic exciter. The generally cylindrical walls of the monomer reservoir serve as cylinder walls and the piston was employed to transmit the reciprocating motion produced by the exciter to the monomer mixture, thereby causing the monomer mixture to pass through the orifice plate in an intermittent manner which has the frequency of the variable frequency acoustical exciter. The intermittent expulsion of monomer solution from the monomer reservoir resulted in a plurality of relatively uniform diameter monomer droplets in the aqueous solution of carboxymethylmethylcellulose. The frequency of oscillation was about 330 cycles per second. The resultant dispersion of generally uniform sized monomer droplets was transferred from the column to a polymerization reactor. A 1 percent by weight solution of carboxymethyl methylcellulose was added to the reaction mixture to provide a carboxymethyl methylcellulose concentration of 0.2 weight percent. The suspension being polymerized was about 55 volume percent of monomer droplets, based on the total volume of monomer and the dispersing phase. The polymerization reactor had an anchor-type agitator rotated at about a speed of 90 revolutions per minute. The polymerization was conducted at about 80° C. for a period of 20 hours and an additional 10 hours at a temperature of 95° C. A portion of the resultant particles were immersed in toluene for a period of 24 hours at room temperature and the swelling factor was determined to be 26.8.

A plurality of 9.8 gram samples of the lightly crosslinked particles were coated with 0.2 gram of Ajax Jigger P clay and pressurized with various blowing agents in the hereinbefore described manner. The pressurization time was about 16 hours at a temperature of 80° C. The experimental data is summarized in Table X.

TABLE X

Pressurization of 0.93 mm Diameter Beads with VOBA Mixtures and Primary Foaming in 130° C. Air

| No. | VOBA Mixture $CF_2Cl_2/CFCl_3$ | Volatile in EP (wt %) | VOBA in EP $CF_2Cl_2/CFCl_3$ | Primary Foaming In 130° C. Air ($V_f/V_s$) Minutes | | | | | | |
|---|---|---|---|---|---|---|---|---|---|---|
| | | | | 0.5 | 1 | 3 | 5 | 10 | 20 | 30 |
| 8-1 | 50/50 | 31.7 | 41/59 | Non Homogeneous VOBA in Beads | | | | | | |
| 8-2 | 55/45 | 31 | 49/51 | Non Homogeneous VOBA in Beads | | | | | | |
| 8-3 | 60/40 | 28.6 | 53/47 | 38 | 52 | 85 | 105 | 140 | 160 | 193 |
| 8-4 | 65/35 | 29 | 56/44 | 36 | 50 | 74 | 90 | 120 | 157 | 198 |
| 8-5 | 70/30 | 28.6 | 61/39 | 37 | 48 | 72 | 89 | 114 | 157 | 173 |
| 8-6 | 75/25 | 26.0 | 67/33 | 34 | 46 | 70 | 87 | 112 | 153 | 160 |
| 8-7 | 80/20 | 24.3 | 71/29 | 27 | 40 | 68 | 83 | 106 | 146 | 161 |
| 8-8 | 85/15 | 23.5 | 77/23 | 25 | 40 | 64 | 80 | 104 | 132 | 150 |
| 8-9 | 90/10 | 19.8 | 83/17 | 22 | 34 | 61 | 79 | 104 | 122 | 116 |
| 8-10 | 95/5 | 20.4 | 90/10 | 15 | 23 | 54 | 72 | 98 | 101 | 101 |
| 8-11 | 100/0 | 19.0 | 100/0 | 16 | 26 | 53 | 66 | 83 | 104 | 116 |

The data set forth in Tables X and XI indicate that it is desirable to maintain the level of trichlorofluoromethane below about 45 weight percent of the total volatile organic blowing agent when employed in combination with dichlorodifluoromethane. Unexpanded particles having blowing agent compositions of Samples 8-3 to 8-11 inclusive were foamed in 130° C. air to obtain an expansion ratio, that is the volume of foam to the volume of the solid bead of from about 45 to 55. The resultant particles were aged in room temperature air for a period of 24 hours prior to pressurizing for a period of 20 hours employing nitrogen under a pressure of 50 pounds per square inch gauge. Secondary foaming of the particles was obtained by exposing them to air at a temperature of 130° C. while the particles were contained in aluminum foil weighing dishes. The exposure to 130° C. air occurred immediately after releasing the nitrogen pressure. The results are summarized in Table XI.

TABLE XI

Secondary Foaming of EP Foam Particles Pressurized 20 Hours with 50 psig $N_2$

| No. | Primary Foaming $V_f/V_s$ | Sec at 130° C. | Secondary Foaming $V_f/V_s$ | | | |
|-----|------|------|--------|--------|-------|-------|
|     |      |      | 15 sec | 30 sec | 1 min | 3 min | 5 min |
| 8-3 | 47.8 | 60   | 83  | 65 | <30 | — | — |
| 8-4 | 45.8 | 52   | 123 | 29 | 173 | 95 | 32 |
| 8-5 | 45.0 | 60   | 165 | 73 | 180 | 210 | 158 |
| 8-6 | 48.4 | 60   | 165 | 83 | 191 | 215 | 230 |
| 8-7 | 62   | 120  | 190 | 33 | 260 | 260 | 230 |
| 8-8 | 55.5 | 96   | 171 | 90 | 246 | 238 | 214 |
| 8-9 | 54.9 | 100  | 164 | 86 | 274 | 262 | 203 |
| 8-10 | 54.7 | 120 | 144 | 48 | 196 | 203 | 230 |
| 8-11 | 45.9 | 125 | 130 | 38 | 170 | 215 | 236 |

EXAMPLE 3

A plurality of lightly crosslinked styrene polymer beads were preared in accordance with the preparation of Samples 1-6 wherein varying amounts of divinylbenzene and benzoyl peroxide were employed to provide crosslinked and uncrosslinked polymers of varying weight average molecular weights. Uncrosslinked samples were prepared by the omission of the divinylbenzene in ethylvinylbenzene, but under identical polymerization conditions to the crosslinked polymers. The swelling factor for the crosslinked polymers was determined by immersing 1 millimeter thick cast sheets in toluene for a period of 24 hours and subsequently weighing the resultant gel and dividing the weight of the resultant gel by the weight of the unswollen sheet. The results are set forth in Table XII.

TABLE XII

Suspension Polymerized Crosslinked Polystyrene Beads With Variable Initiator and DVB Concentrations

| No. | Composition % Styrene | % DVB | % EVB | % $Bz_2O_2$ | % tBPB[1] | $W_g/W_s$[2] | Z[3] |
|-----|------|-------|-------|-------|-------|------|------|
| 9   | 99.769 | 0.026 | 0.006 | 0.1 | 0.1 | 30.6 | 1.10 |
| 10  | 99.650 | 0.04  | 0.01  | 0.2 | 0.1 | 31.8 | 1.15 |
| 11  | 99.523 | 0.062 | 0.015 | 0.3 | 0.1 | 30.9 | 1.13 |
| 12  | 99.1819 | 0.097 | 0.024 | 0.6 | 0.1 | 33.0 | 1.08 |

[1]Tert butyl peroxybenzoate
[2]$W_g/W_s$ = weight of swollen gel/solid polymer weight
[3]Calc. crosslinking coefficient using Mw values obtained via GPC for polystyrene produced with the same initiator concentrations without DVB. 9 Mw = 554,000; 10 Mw = 373,000; 11 Mw = 237,000; 12 Mw = 144,000.

Eight gram samples of the four lightly crosslinked polymers set forth in Table XII were each coated with 0.196 gram of submicron Kaolinite and subsequently pressurized with a mixture of 3 parts by weight of dichlorodifluoroethane and 1 part by weight of trichlorofluoromethane for a period of 16 hours at 80° C. in the manner hereinbefore described. The resultant blowing agent impregnated particles were stored for a period of 24 hours at a temperature of −20° C. Blowing agent impregnated samples were then subjected to 130° C. air for varying periods of time. The ratio of the foam volume to solid volume determined and the results are set forth in Table XIII.

TABLE XIII

Primary Expansion of EP Listed in Table XII

| No. | Volatile[1] Content (wt %) | Foam Expansion Ratio After Indicated Time in 130° C. Air $V_f/V_s$ | | | | | | |
|-----|------|--------|--------|-------|-------|-------|--------|--------|
|     |      | 15 sec | 30 sec | 1 min | 3 min | 5 min | 10 min | 30 min |
| 9a  | 28.6 | 23 | 36 | 55 | 82  | 102 | 136 | 153 |
| 10a | 30.6 | 24 | 34 | 59 | 84  | 94  | 142 | 138 |
| 11a | 27.0 | 27 | 50 | 63 | 109 | 127 | 157 | 194 |
| 12a | 28.3 | 27 | 47 | 48 | 106 | 121 | 128 | 188 |

[1]These beads were impregnated with 75/25 $CF_2Cl_2/CFCl_3$ to the indicated concentration but actual VOBA in the polymer may be closer to 67/33 $CF_2Cl_2/CFCl_3$.

Examination of the particles prepared in Table XIII by compression between fingertips indicated substantial variation in toughness between foams prepared with different benzoyl peroxide concentrations. Variability of toughness was quantified by measurement of the force required to compress single foam particles to 0.1 of their initial diameter between parallel plates in an Instron testing apparatus, particles and average diameters ranging from about 3.8 to 5.1 and were compressed at a rate of about 12.7 millimeters per minute. After reaching full compression, the compressive load is removed for a period of about 30 seconds prior to again loading and compressing the particle to 0.1 of its initial diameter. Five cycles of such compression were employed and the results of such testing are set forth in Table XIV.

TABLE XIV

Cyclic Compression of EP Particles from Table XIII

| No. | Foam Time (mins) | $V_f/V_s$ | Load[1] After Indicated No. of Comp. Cycles (psi) | | % Ret[2] |
|-----|------|-----|------|-------|------|
|     |      |     | 1    | 5     |      |
| 9-B  | 1  | 54  | 33   | 30    | 91 |
|      | 30 | 153 | 29   | 26    | 89 |
|      | 45 | 164 | 27   | 24.5  | 91 |
|      | 60 | 143 | 26.5 | 23    | 87 |
| 10-B | 1  | 59  | 34   | 30    | 88 |
|      | 30 | 138 | 25   | 21    | 84 |
|      | 45 | 143 | 24   | 20    | 83 |
|      | 60 | 118 | 15   | 4     | 26 |
| 11-B | 1  | 63  | 33   | 29    | 88 |
|      | 30 | 194 | 28   | 23    | 82 |
|      | 45 | 162 | 23   | 19.5  | 85 |
|      | 60 | 112 | 10   | ~1    | 10 |
| 12-B | 1  | 48  | 32   | 28.5  | 89 |
|      | 3  | 106 | 29   | 23    | 77 |
|      | 5  | 121 | 25   | 22    | 88 |
|      | 7.5 | 139 | 26  | 19.5  | 75 |
|      | 10 | 128 | 12   | ~1    | 8 |

[1]psi required to compress particle to 0.1 initial diameter
[2]Failure values via this test are underlined
% Ret = load 5th cycle/load 1st cycl · 100

Unexpanded particles as set forth in Table XII were initially foamed by heating in air at 130° C. on an aluminum cookie sheet until the primary expansion ratio had reached a value between about 50 and 60 to provide a plurality of prefoamed particles. The particles after initial foaming were cooled to room temperature and permitted to remain overnight under normal atmospheric conditions, that is at a temperature of about 23° C., and a pressure of about one atmosphere absolute. The foam particles of each sample were then placed in one-inch diameter by 6-inch long glass pressure tubes and subjected to a pressure of 50 pounds per square inch gauge of nitrogen at a temperature of 23° C. for a period of 24 hours. On release of the nitrogen pressure after the 24-hour period, the foam particles were placed on 57 millimeter aluminum weighing dishes which were subsequently placed in a preheated air oven for periods of one-quarter, one-half, one, three and five minutes respectively. The expansion ratios of the samples were measured by a buoyancy technique immediately after removal from the oven and also 24 hours after removal from the oven. No significant change was noted in the expansion ratio as determined from the particles immediately after removal from the ovens and 24 hours later. Expansion ratios for variable times after exposure to 130° C. for samples of Table VII and compression values obtained in the manner hereinbefore described are set forth in Table XV.

TABLE XV

Secondary Foaming and Compression Data for $N_2$ Pressurized Foam Particles

| No. | Primary $V_f/V_s$ | $V_f/V_s$ After Variable Time in 130° C. Air | | | | |
|---|---|---|---|---|---|---|
| | | 15 sec | 30 sec | 1 min | 3 min | 5 min |
| 9c  | 58 | 140 | 138 | 147 | 156 | 175 |
| 10c | 52 | 160 | 187 | 195 | 216 | 197 |
| 11c | 52 | 152 | 172 | 194 | 224 | 222 |
| 12c | 55 | 192 | 197 | 236 | 46  | 35  |

EXAMPLE 4

Unexpanded crosslinked particles as set forth in Table X, Sample 11 were foamed to an expansion ratio of about 58 by exposure to 130° C. air for a period of 200 seconds and to an expansion of 75 in a period of 400 seconds at a temperature of 130° C. The expanded particles were aged for 24 hours at room temperature and ambient air pressure. At the end of this period of time, portions of the samples were pressurized with 50 pounds per square inch gauge of nitrogen for a period of two days and two of the samples were pressurized with air at a pressure of 50 pounds per square inch gauge, for two days. The pressurized samples were exposed to 130° C. air for varying periods of time and the expansion factor, that is the volume of foam over the volume of the initial solid, determined. The results are set forth in Table XVI.

TABLE XVI

Seconday Foaming of EP Foam Particles Pressurized with Air and $N_2$

| No. | Primary $V_f/V_s$ | Pressuring Gas | Secondary Foaming at 130° C. $V_f/V_s$ | | | | |
|---|---|---|---|---|---|---|---|
| | | | 15 sec | 30 sec | 1 min | 3 min | 5 min |
| 11-D-1 | 58 | Air    | 197 | 240 | 238 | 235 | 240 |
| 11-D-2 | 58 | $N_2$  | 195 | 230 | 235 | 228 | 228 |
| 11-D-3 | 75 | Air    | 242 | 260 | 247 | 150 | 95  |
| 11-D-4 | 75 | $N_2$  | 260 | 258 | 255 | 95  | 50  |

Very desirable foaming ratios are obtained from the particles having an initial foaming ratio of 58 with a longer secondary exposure whereas desirable volumes are obtained at shorter exposure for the samples having 75 foaming volume factor.

EXAMPLE 5

A plurality of expandable lightly crosslinked styrene polymer particles were prepared from the monomer and initiator composition used for Sample 8. However, with the variation that 23 weight percent based on the weight of the monomer mixture of trichlorotrifluoroethane was dissolved in the monomer prior to dispersion in an aqueous solution containing 0.2 weight percent methylcellulose as a suspending agent. The polymerization conditions employed were identical to those employed for Sample 8. The resultant polymer particles varied in diameter from about 0.4 to 1.6 millimeters and the swelling ratio in toluene was 34.8. The concentration of the trichlorotrifluoroethane in the polymerized particle was 19.1 percent based on the total weight of the particle. The primary foaming of the particles was accomplished by exposure to air at ambient pressure for varying periods of time. The results are set forth in Table XVII.

TABLE XVII

Primary Foaming of Styrene-co-0.04% DVB EP Particles Containing $C_2F_3Cl_3$ in 130° C. Air

| No. | Foam Expansion Ratio After Indicated Time $V_f/V_s$ | | | | | |
|---|---|---|---|---|---|---|
| | 30 sec | 1 min | 3 min | 10 min | 30 min | 1 hr |
| 13 | 17 | 32 | 61 | 119 | 155 | 149 |

Portions of the expandable particles utilized to obtain the data set forth in Table XVII were expanded for varying periods of time to obtain expansion ratios of 30, 49 and 68, respectively, in periods of 45, 120 and 240 seconds, respectively. The once-expanded particles were then subjected to a pressure of 50 pounds per square inch gauge of nitrogen for a period of 66 hours. Subsequently, the pressurized foam particles were reheated to a temperature of 130° C. in air at atmospheric pressure to provide secondary foaming thereof. The results are set forth in Table XVIII.

TABLE XVIII

Secondary Foaming of Sample 13 EP Particles After Primary Foaming and Pressurization 66 Hours Under 50 psig $N_2$

| No. | $V_f/V_s$ After Primary Foaming | Secondary $V_f/V_s$ Ratios After Indicated Time in 130° C. Air | | | | |
|---|---|---|---|---|---|---|
| | | 15 sec | 30 sec | 1 min | 3 min | 5 min |
| 13-1 | 30 | 43  | 42  | 47  | 50  | 50  |
| 13-2 | 49 | 83  | 82  | 85  | 86  | 77  |
| 13-3 | 68 | 115 | 121 | 127 | 110 | 115 |

Compare with 11-D-2 Table XVI.

Portions of the unexpanded beads having 20.6 weight percent trichlorotrifluoroethane were coated with 2 weight percent of submicron Kaolinite and subsequently impregnated with dichlorodifluoromethane in the hereinbefore described manner. The impregnation time was 16 hours at a temperature of 80° C., the total resultant volatile content of the crosslinked expandable styrene polymer particles was 27.6 weight percent. No analysis was made for the ratio of dichlorodifluoromethane to trichlorotrifluoroethane in the expandable particles. Primary foaming of the impregnated particles was carried out by exposure of the particle to hot air at a temperature of 130° C. and the expansion ratio determined.

TABLE XIX

Primary Foaming of Styrene-co-0.04% DVB EP Containing $C_2F_3Cl_3$ and Pressurized with Pure $CF_2Cl_2$ to Total Volatile = 27.6%

| No. | Foam Expansion Ratio After Indicated Time at 130° C. ($V_f/V_s$) | | | | | | | |
|---|---|---|---|---|---|---|---|---|
| | 30 sec | 1 min | 3 min | 10 min | 20 min | 30 min | 45 min | 60 min |
| 13-A-1 | 13 | 55 | 95 | 164 | 231 | 272 | 300 | 258 |

The hereinbefore described particles containing dichlorodifluoromethane and trichlorotrifluoroethane were expanded to an initial expansion ratio of 54.8 and subsequently pressurized with 50 pounds per square inch gauge of air for a period of 3.5 hours. Portions of the particles were exposed to 130° C. air for varying periods of time and the foaming ratio determined. The results are set forth in Table XX.

TABLE XX

Secondary Foaming of EP Particles After Primary Foaming to 54.8 $V_f/V_s$ and Pressurization in 50 psig Air for 22.5 Hours

| No. | Secondary $V_f/V_s$ Ratios After Indicated Time In 130° C. Air | | | | |
|---|---|---|---|---|---|
| | 15 sec | 30 sec | 1 min | 3 min | 5 min |
| 13-A-2 | 171 | 153 | 184 | 225 | 264 |

As is readily apparent from the foregoing expansion data, the addition of dichlorodifluoromethane to particles containing trichlorotrifluoroethane results in a significant improvement in the secondary foaming characteristics.

EXAMPLE 6

A box mold was prepared in the following manner: Stainless steel sheet having a thickness of about 0.20 inch was bent into an open topped box measuring about 6½ inches by 6½ inches by 1¼ inches. The side walls were tapered outwardly from the bottom at an angle of about 5 degrees to facilitate removal of the foam molding. The box had an open top measuring about 6½ by 6½ inches. The corners of the box were soldered together and a flat tubular heat exchange tube of copper tubing was soldered on the outside of the bottom of the box to thereby facilitate heating with steam or cooling with water. The bottom of the box was perforated with a plurality of holes having a diameter of about 0.028 inches spaced on 1-inch centers. A second box somewhat larger than the first box and sufficient to contain the first box with the heat exchange tubing was fabricated and provided with a ¼-inch diameter vent tube soldered in the center of the bottom. The second box was placed over the heat exchanger and soldered into place. The purpose of the ¼-inch diameter tube in the second box was to permit pressure reduction in the mold cavity during the molding process. A mold was completed by providing a cover for the open side of both boxes wherein the cover was provided with a rubber gasket having a thickness of about ⅛ inch, disposed in a groove about the perimeter of the mold to provide an effective seal. The mold is loosely filled with nitrogen or air pressurized expandable particles of about density equal to about the density of the final molded product. In order to obtain a desired degree of interparticulate fusion, the ratio of the volume of the unconfined secondary foamed particle to the primary foamed particle should be equal to or greater than about 2. When the mold has been filled, the cover was clamped in place and the particles heated either by means of steam under pressure or by means of hot air. Optionally, such heating may be accomplished together with a reduction in the pressure within the mold, that is provide subatmospheric pressure to increase particle expansion, improve surface appearance and improve the interparticulate particle fusion. When the desired degree of fusion has been obtained, heating is discontinued, and the mold cooled by providing cold water within the heat exchange tubing. In the event that reduced or subatmospheric pressure was employed, atmospheric pressure is subsequently restored after cooling of the molding and the molding removed from the mold.

A plurality of polymer particles (Sample 14) were prepared as hereinbefore described for the particles utilized in the preparation of expandable particles set forth in Table II. Spherical particles 1.53 millimeters in average diameter were impregnated with 17.1 weight percent of a 73 to 27 parts by weight of dichlorodifluoromethane and trichlorotrifluoroethane. The particles were heated for a period of 7½ minutes in an air oven at a temperature of 130° C. to produce free flowing particles having an initial expansion factor of 100. The initially expanded particles were then pressurized for a period of 47 hours with 22 pounds per square inch gauge of air. The pressurized particles were then, on depressurization placed in the mold cavity to fill the cavity. The mold was closed; 35 pounds per square inch gauge steam was passed through the heat exchange tube to raise the surface temperature within the mold to about 125° C. After a period of heating of about 2 minutes, the pressure within the mold cavity was reduced to about 15 to 20 inches of mercury absolute. The steam turned off and cooling water was applied for a period of about 15 seconds. On completion of the cooling, the pressure within the mold cavity was restored to atmospheric, the mold opened and the molded article removed therefrom. Inspection of the molded article indicated that excellent interparticulate fusion had been obtained and that the molding was resilient, the surface and dimensions of the mold cavity were faithfully reproduced and no post molding shrinkage was observed. The density of the molding was about 0.25 pound per cubic foot.

The procedure of the foregoing molding operation was repeated using identical polymer particles which had been impregnated with a 70 to 30 weight percent mixture of dichlorodifluoromethane and trichlorofluoromethane to provide a total content of volatile blowing agent of 17.9 weight percent (Sample 15). The expandable particles were heated in air at a temperature of 130° C. for a period of 5 minutes to obtain initially expanded particles having expansion ratio of 72. The initially expanded particles were then pressurized with 37 pounds per square inch of air for a period of 26 hours. At the end of this period, the mold was filled with the expanded particles, the cover clamped to the mold and the mold heated by means of 45 pounds per square inch gauge steam passed through the heat exchanger, wherein the surface temperature of the mold rose to a temperature of about 130° to 135° C. The pressure within the mold was maintained at atmospheric pressure. The steam heating of the mold was maintained for a period of three minutes after which the cooling water was applied for a period of one minute. On opening of the mold, the surface temperature was indicated to be about 70° C. The molded article had a density of about 0.46 pounds per cubic foot. Excellent fusion of particles was obtained and the molding was resilient and tough. No shrinkage was observed and the dimensions and surface of the mold were faithfully reproduced.

A second mold was constructed generally in accordance with the construction of the first mold. The second mold had dimensions approximately 8 inches by 8 inches and 1 inch deep. The walls of the mold were perforated for direct introduction of steam into the mold cavity. A plurality of particles were prepared by the polymerization of styrene containing 0.04 weight percent divinylbenzene, 0.2 weight percent benzoylperoxide and 0.1 weight percent tertiary butylperoxybenzoate. Monomer droplets were of generally uniform size and obtained in a hereinbefore described polymerization procedure utilizing the orifice plate and monomer reservoir pulsed at about 500 cycles per second. Polymerization was carried out for 20 hours at 80° C. and for 10 additional hours at 90° C. Polymerization was complete, the particles were impregnated with a 90 to 10 by weight mixture of dichlorodifluoromethane and trichlorotrifluoroethane while still in the aqueous suspension at a temperature of about 85° C. The particles were separated from the suspension medium by filtering and drying in an air oven. The resultant particles contained a total volatile content of 14.9 weight percent (Sample 16). Portions of the beads were heated in 130° C. air for 2 minutes to provide a foaming ratio of 73. The particles had a bulk density of about 0.47 pounds per cubic foot. The expanded beads were aged at atmospheric pressure and ambient temperature for a period of 20 hours prior to filling the mold cavity. The mold was closed. The steam at a pressure of 40 pounds per square inch gauge was introduced into the mold through perforations in the walls thereof. Steam was applied to the mold for a period of 45 seconds; 15 seconds elapsed until cooling water was applied for a period of 15 seconds. The maximum molding temperature observed was 117° C. On removal of the molding from the mold, shrinkage and warpage were observed. The initial density of the molding when removed from the mold was 1.05 pounds per cubic foot. The molding was aged in air at ambient temperature for a period of 22 hours. After 22 hours, the molding had expanded to a shape which faithfully reproduced that of the mold cavity, and the molding had a density of 0.5 pound per cubic foot. It is believed that such reduction in density and returning to the configuration of the mold cavity is due to air permeation into the molding.

EXAMPLE 7

A plurality of particles of the lightly crosslinked styrene copolymer beads employed in the previous molding experiment were impregnated with an 80:20 by weight mixture of dichlorodifluoromethane and trichlorotrifluoromethane to provide expandable particles (Sample 17) having a total volatile content of 17.7 weight percent. Impregnated particles were exposed to air at a temperature of 130° C. for a period of 5 minutes. The foaming factor was 74 and the expanded particles had a foamed density of about 0.48 pound per cubic foot. The once expanded particles were then pressurized with 15 pounds per square inch gauge of air for a period of 20 hours. The particles were then subjected to ambient atmospheric pressure and placed in the hereinbefore described 8-inch by 8-inch by one-inch mold. The mold and contents were then heated with 40 pounds per square inch gauge steam for 55 seconds to obtain a mold temperature of 115° C. and were subsequently cooled with water for a period of 15 seconds. The maximum temperature recorded during the molding was 116° C. and the maximum pressure in the mold was 23 pounds per square inch gauge. The molding exhibited some shrinkage with no warping. The initial density of the molding was 0.68 pounds per cubic foot. The molding was aged under ambient atmospheric conditions for a period of 19 hours whereupon the density of the molding was determined to be 0.5 pound per cubic foot. The foam molding reproduced the configuration of the mold well. No internal voids were apparent and fusion was very satisfactory.

EXAMPLE 8

Three moldings in accordance with the present invention were prepared and one molding in accordance with the conventional expandable polystyrene art was prepared and the four samples were evaluated. Cushioning characteristics by means of the American Society for Testing Materials procedure D1596 consists of dropping a series of known weights through known distances onto a pad of cushioning material of predetermined dimensions. An accelerometer attached to the weights detects the amount of shock encountered and translates into an electrical signal to an oscilloscope. The trace provides a signal indicative of the cushioning characteristics of the material.

The data obtained by the American Society for Testing Materials procedure D1596 for dynamic cushioning indicates that the use of low density cushioning foams produced in accordance with the present invention saves raw materials and improves cushioning performance for shipment of light articles. Low density moldings prepared in accordance with the present invention exhibit less loss of thickness during repeated compressions than conventional 1.5 pounds per cubic foot expandable polystyrene shaped moldings. Note Table XXI wherein various moldings have been compressed to 25 percent of their original thickness from 1 to 5 cycles.

TABLE XXI

| | Effect of Repeated Compressions to 25% of Original Height | | | | | |
|---|---|---|---|---|---|---|
| | | Cycle (Thickness Loss, % Orig.) | | | | |
| No. | Foam Molding | 1 | 2 | 3 | 4 | 5 |
| 18-1* | 1.5 pcf | 23 | 25 | 25.5 | 26 | 27 |
| 19-2 | 1 pcf Hot Air Molded EP | 7 | 8 | 9 | 9.5 | 10 |
| 20-3 | 0.45 pcf Hot Air Molded EP | 7 | 9 | 9 | 9.5 | 10 |
| 21-4 | 0.25 pcf Hot Air Molded EP | 7 | 9 | 11 | 12 | 13 |

*Commercially available expanded polystyrene molding - not an example of the invention.

A substantial improvement in resiliency is obtained in Samples 19, 20 and 21, which have been prepared in accordance with the present invention.

EXAMPLE 9

A plurality of partially reinflated expandable polystyrene particles (Sample 22) expanded under the conditions specified for Sample 2, Table IV are employed as loose fill dunnage in a box measuring 12 × 12 × 12 inches with a cube measuring 6 inches on a side with a load density of 0.15 pound per square inch. A portion of the particles were added to the box. The 6-inch cube cubic weight was then added to the box and centrally positioned therein and the remaining space within the box filled with the partially expanded foam particles having a bulk density of about 0.2 pound per cubic foot. The box was then closed and allowed to stand for a period of 24 hours during which time the partially reinflated particles expanded further to form a plurality of generally tesselated, generally spherical particles. The box and the weight were then subjected to a shake test wherein the box was vibrated at a frequency of about 4½ half cycles per second with a 2-inch displacement for a period of 30 minutes. On completion of the vibration or shake test, no change in position of the 6-inch cube had occurred. Particles in accordance with the present invention provide a highly desirable loose fill dunnage for light fragile items.

In a generally similar manner, reinflatable or partially reinflatable particles in accordance with the present invention provide a desirable loose fill thermal insulation which can be readily applied to wall cavities, cavities in cement block walls, spaces between masonry walls, and like regions which can benefit from thermal insulation. The partially inflated particles may be applied to such cavities and within a period of relatively few hours expand to add a generally continuous insulating body assuming that an adequate quantity of particles has been added to the space to be filled.

EXAMPLE 10

A plurality of polymerizations were conducted employing a mixture prepared from 179.9 grams of styrene, 0.092 grams of a mixture of 77.9 weight percent divinylbenzene and 22.1 percent of ethylvinylbenzene; 0.36 grams of benzoyl peroxide and 0.126 grams of tertiary-butylperoxybenzoate. Into eight 6-inch long ¾-inch diameter glass ampules were placed 22 grams of the hereinbefore described styrene mixture together with about 7 weight percent of various blowing compositions. Each blowing composition was either a hydrocarbon, approximately 7 weight percent based on the styrene mixture, or the hydrocarbon plus 20 milligrams of water to provide a total of eight samples. Each ampule was sealed and heated in an upright position for a period of 4 days at a temperature of about 80° C. and for an additional period of one day at a temperature of about 125° C. Solid rods of polymer containing entrapped volatile blowing material were removed from the ampules after the ampules and polymer had been cooled to room temperature. The resultant polymer rods were separately ground into small particles and screened to obtain particles which passed through a 12 mesh screen and were retained on a 16 mesh screen, the screen apertures being about 1.68 and 1.19 millimeters, respectively. Portions of each sample were analyzed for volatile content and the difference in solubility parameters of the polymer and the organic blowing agent calculated. These values are set forth in Table XXII.

TABLE XXII

| | | Series 1 EP Compositions | | | | |
|---|---|---|---|---|---|---|
| No. | Mixt A (grams) | VOBA (grams) | Type | H$_2$O (grams) | Volatile[a] (wt %) | $\delta_p - \delta_s$[b] (calc) |
| 23 | 22 | 1.65 | Isopentane | None | 6.1 | 2.35 |
| 24 | 22 | 1.65 | Isopentane | 0.02 | 6.1 | 2.35 |
| 25 | 22 | 1.65 | Isobutane | None | 4.7 | 2.85 |
| 26 | 22 | 1.65 | Isobutane | 0.02 | 6.2 | 2.85 |
| 27 | 22 | 1.65 | n-Pentane | None | 5.9 | 2.05 |
| 28 | 22 | 1.65 | n-Pentane | 0.02 | 6.2 | 2.05 |
| 29 | 22 | 1.65 | n-Butane | None | 5.3 | 2.4 |
| 30 | 22 | 1.65 | n-Butane | 0.02 | 6.6 | 2.4 |

[a] $100 - \left( \dfrac{\text{wt polymer sample after 1 hr at 175° C.}}{\text{initial wt}} \times 100 \right)$.

[b] $\delta_s$ is the calculated $\delta$ value of the VOBA.

Portions of all eight samples were heated in air at a temperature of 130° C. for varying periods of time and the expansion ratio, ER, that is volume of foam to volume of solid, measured by water displacement after the foams had cooled to room temperature. The results are set forth in Table XXIII.

TABLE XXIII

| | Primary Foaming | | | | | | |
|---|---|---|---|---|---|---|---|
| | ER After Indicated Time (Minutes) at 130° C. | | | | | | |
| No. | 0.5 | 1 | 3 | 5 | 7.5 | 10 | Cell Size |
| 23[a] | 3.8 | 9.6 | 23 | 29 | 34 | 38 | Medium |
| 24[a] | 10.7 | 18.0 | 26 | 32 | 38 | 46 | Fine |
| 25[a] | 3.4 | 6.7 | 21 | 26 | 32 | 37 | Med Fine |
| 26[a] | 5.7 | 11.1 | 26 | 31 | 36 | 39 | Very Fine |
| 27[a] | 3.6 | 8.9 | 17 | 19 | 21 | 24 | Medium |
| 28[a] | 9.2 | 14.9 | 25 | 27 | 31 | 32 | Med Fine |
| 29[a] | 5.5 | 13.0 | 21 | 23 | 26 | 28 | Medium |
| 30[a] | 5.3 | 10.7 | 21 | 23 | 27 | 28 | Very Fine |

[a] Estimated cell size values are Medium 0.3–0.5 mm diameter; Medium Fine 0.25–0.3 mm; Fine 0.2–0.25 mm; Very Fine <0.2 mm.

Foamed particles which had been exposed to 130° C. air for a period of 3 minutes were cooled to room temperature, permitted to age at ambient temperature and air pressure for a period of 3 hours. After aging, the particles were subsequently pressurized with 50 pounds per square inch gauge of air for a period of 20 hours at room temperature. At the end of that period of time the pressure was reduced to atmospheric and the samples were immediately heated to 130° C. in an air oven, and the expansion ratio calculated, which is the volume of the twice expanded particle divided by the volume of the unexpanded particle for various periods of time. Also set forth is the secondary foaming response, or ratio, together with the minimum foam density obtained by heating for the various periods of time.

TABLE XXIV

| | Stage 1 Secondary Foaming of 50 psig Air Pressurized Foams | | | | | |
|---|---|---|---|---|---|---|
| | ER Prior to Air | ER of Pressurized Foam After Indicated Time at 130° C. | | | | |
| No. | Pressure | 0.25 | 0.5 | 1 | 3 | 5 |
| 23b | 23.2 | 38 | 42 | 54 | 54 | 49 |
| 24b | 25.9 | 42 | 52 | 58 | 68 | 67 |
| 25b | 22.7 | 56 | 59 | 74 | 72 | 73 |
| 26b | 20.6 | 42 | 61 | 80 | 88 | 83 |
| 27b | 15.9 | 26 | 46 | 57 | 60 | 62 |
| 28b | 19.5 | 30 | 38 | 51 | 51 | 57 |
| 29b | 19.9 | 29 | 40 | 52 | 52 | 58 |
| 30b | 17.1 | 34 | 44 | 68 | 75 | 72 |

| Secondary Foaming Responses for the Above Series | | | | | | |
|---|---|---|---|---|---|---|
| | $V_s/V_{pf}$ | | | | | Minimum Foam Density |
| No. | 0.25 | 0.5 | 1 | 3 | 5 | (pcf) |

TABLE XXIV-continued

| | | | | | | |
|---|---|---|---|---|---|---|
| 23c | 1.63 | 1.81 | 2.32 | 2.32 | 2.11 | 1.15 |
| 24c | 1.62 | 2.00 | 2.24 | 2.62 | 2.58 | 0.93 |
| 25c | 2.47 | 2.60 | 3.26 | 3.17 | 3.22 | 0.84 |
| 26c | 2.04 | 2.96 | 3.88 | 4.27 | 4.03 | 0.71 |
| 27c | 2.26 | 2.89 | 3.52 | 3.77 | 3.90 | 1.00 |
| 28c | 1.54 | 1.95 | 2.61 | 2.61 | 2.92 | 1.09 |
| 29c | 1.45 | 2.01 | 2.61 | 2.61 | 2.91 | 1.07 |
| 30c | 1.99 | 2.58 | 3.97 | 4.39 | 4.21 | 0.83 |

Comparing the values of expansion ratio of the twice foamed particles and the second foaming responses, the significance of obtaining initial expansion ratios of 50 or greater for producing very light foams during the second or stage 2 secondary foaming can be appreciated.

When expanded particles set forth in Table XXIII were repressurized with 30 pounds per square inch gauge after three hours at ambient temperature and pressure for a period of 20 hours and the particles again subjected to 130° C. air for various periods of time, total expansion ratios as set forth in Table XXV were obtained.

TABLE XXV

Stage 2 Secondary Foaming of 30 psig Air Pressurized Foams

| No. | ER Prior to Air Pressurization | ER of Pressurized Foam After Indicated Time at 130° C. (Minutes) | | | | Minimum Foam Density (pcf) |
|---|---|---|---|---|---|---|
| | | 0.25 | 0.5 | 1 | 3 | 5 | |
| 23d | 52.4 | 74 | 70 | 88 | 84 | 78 | 0.71 |
| 24d | 57 | 85 | 90 | 109 | 98 | 95 | 0.57 |
| 25d | 80.4 | 151 | 150 | 149 | 137 | 128 | 0.41 |
| 26d | 88 | 144 | 144 | 169 | 165 | 157 | 0.37 |
| 27d | 65.1 | 85 | 89 | 83 | 89 | 102 | 0.61 |
| 28d | 53.2 | 68 | 67 | 72 | 74 | 73 | 0.84 |
| 29d | 54.6 | 72 | 83 | 89 | 110 | 84 | 0.57 |
| 30d | 67.2 | 101 | 134 | 116 | 109 | 116 | 0.47 |

Attempts to repressurize particles as obtained in Table XXIV with 50 pounds per square inch gauge air and further expand, resulted in ruptured cell walls and unsatisfactory foam.

EXAMPLE 11

A plurality of samples were prepared by impregnating the expandable polymers of Table XXII with dichlorodifluoromethane as an additional blowing agent. 4.9 grams, generally spherical expandable particles passing through a 14 mesh screen and retained on a 16 mesh screen, U.S. seive size (4.9 grams), were admixed with 0.1 gram of a submicron Kaolinite clay. Portions of the expandable particles together with 4 cubic centimeters of a dichlorodifluoromethane hydrocarbon (HC) mixture were sealed in glass ampules as employed in Example 1. The ampules were then heated to 80° C. for a period of 16 hours while rotated end-to-end at 10 revolutions per minute. Composition of the various samples are set forth in Table XXVI.

TABLE XXVI

Formulations Containing Mixed HC and $CF_2Cl_2$ VOBA's

| No. | Primary EP Feedstock | Total[a] Volatile in Particles | VOBA Mixture[b] | | $\delta$ VOBA Mixture Calculated |
|---|---|---|---|---|---|
| | | | Wt % $CF_2Cl_2$ | Wt % HC | |
| 31 | 23 | 19.4 | 68.6 | 31.4 Isopentane | 6.4 |
| 32 | 24 | 21.2 | 71.2 | 28.8 Isopentane | 6.36 |
| 33 | 25 | 18.8 | 73.9 | 26.1 Isobutane | 6.16 |
| 34 | 26 | 16.3 | 62.0 | 38.0 Isobutane | 6.2 |
| 35 | 27 | 21.0 | 71.9 | 28.1 n-Pentane | 6.48 |
| 36 | 28 | 24.4 | 75.1 | 24.9 n-Pentane | 6.44 |
| 37 | 29 | 19.1 | 72.25 | 27.75 n-Butane | 6.37 |
| 38 | 30 | 19.8 | 66.7 | 33.3 n-Butane | 6.40 |

[a] $100 - \left( \frac{\text{wt polymer after 1 hr at 175° C.}}{\text{initial polymer wt}} \cdot 100 \right)$.

[b] It is assumed that no hydrocarbon was lost from the particles during impregnation with $CF_2Cl_2$.

$\delta$ Calculated solubility parameter.

Primary foaming results, that is expansion ratios, are set forth in Table XXVII.

TABLE XXVII

Primary Foaming

| No. | ER After Indicated Time in Minutes at 130° C. | | | | | |
|---|---|---|---|---|---|---|
| | 0.5 | 1 | 3 | 5 | 10 | 30 | 60 |
| 31 | 20 | 46 | 74 | 94 | 123 | 171 | 212 |
| 32 | 12 | 36 | 76 | 91 | 124 | 184 | 204 |
| 33 | 12 | 29 | 65 | 83 | 117 | 162 | 177 |
| 34 | 17 | 32 | 66 | 75 | 101 | 153 | 168 |
| 35 | 11 | 27 | 61 | 74 | 102 | 161 | 187 |
| 36 | 17 | 40 | 66 | 73 | 87 | 148 | 190 |
| 37 | 13 | 36 | 58 | 82 | 119 | 160 | 195 |
| 38 | 11 | 32 | 64 | 70 | 101 | 149 | 168 |

The samples of polymer described in Table XXVI were foamed to approximately an expansion ratio of 50 and subsequently pressurized for a period of 20 hours under 50 pounds per square inch of air. On release of the air pressure, the foam particles were heated in air at a temperature of 130° C. and ambient pressure for varying time periods. The expansion ratios and times are set forth in Table XXVIII, together with the secondary foaming ratios for varying periods.

TABLE XXVIII

Stage 1 Secondary Foaming of 50 psig Air Pressurized Foams

| No. | ER Prior to Air Pressurization | ER of Foam After Indicated Time in Minutes at 130° C. | | | | |
|---|---|---|---|---|---|---|
| | | 0.25 | 0.5 | 1 | 3.0 | 5.0 |
| 31 | 48 | 112 | 141 | 172 | 208 | 223 |
| 32 | 50.5 | 126 | 125 | 179 | 206 | 217 |
| 33 | 49.9 | 123 | 132 | 173 | 205 | 230 |
| 34 | 49 | 114 | 140 | 169 | 194 | 231 |
| 35 | 51.3 | 130 | 173 | 183 | 205 | 217 |
| 36 | 49.9 | 129 | 141 | 175 | 212 | 255 |
| 37 | 47.3 | 121 | 155 | 177 | 204 | 145 |
| 38 | 47.1 | 116 | 122 | 142 | 172 | 192 |

Secondary Foaming Response for the Above Series

| No. | Minimum Secondary Foam Density (pcf) | $V_{sec\ foam}/V_{pf}$ | | | | |
|---|---|---|---|---|---|---|
| | | 0.25 | 0.5 | 1 | 3.0 | 5.0 |
| 31 | 0.28 | 2.33 | 2.94 | 3.58 | 4.17 | 4.65 |
| 32 | 0.29 | 2.49 | 2.47 | 3.54 | 4.08 | 4.3 |
| 33 | 0.27 | 2.46 | 2.64 | 3.47 | 4.11 | 4.61 |

TABLE XXVIII-continued

| 34 | 0.27 | 2.33 | 2.86 | 3.45 | 3.96 | 4.71 |
| 35 | 0.29 | 2.53 | 3.37 | 3.57 | 4.00 | 4.23 |
| 36 | 0.24 | 2.59 | 2.83 | 3.51 | 4.24 | 5.11 |
| 37 | 0.30 | 2.56 | 3.27 | 3.75 | 4.31 | 3.06 |
| 38 | 0.33 | 2.47 | 2.59 | 3.01 | 3.65 | 4.08 |

EXAMPLE 12

A crosslinked styrene polymer was prepared by polymerization of a mixture comprising 99.7 grams of styrene, 0.1 gram of hydroxyethyl acrylate and 0.2 gram of benzoyl peroxide. The mixture was sealed into a 10-inch long by 1-inch wide diameter glass ampule and heated for six days at a temperature of about 80° C. and an additional one day at a temperature of 125° C. A solid clear rod of styrene polymer was removed from the ampule and ground into particles on a Wiley mill. The molecular weight of the copolymer as determined by gel permeation chromatography analysis was a number average molecular weight of 120,280 molecular weight units and a weight average molecular weight of 370,850. The calculated number of functional pendant hydroxyethyl groups is approximated by the weight average molecular weight divided by the moles of styrene multiplied by 104.14 divided by the number of moles of hydroxyethyl acrylate which gave a value of 3.1. The theoretical number for the crosslinking coefficient is about 1.6, if all the pendant hydroxyethyl were joined by a crosslinking reagent. However, the reaction is believed to be less than 100 percent efficient and the actual crosslink density is similar to that obtained by polymerizing styrene with 0.04 weight percent divinylbenzene using 0.2 weight percent benzoyl peroxide as the initiator at a temperature of 80° C. Fifty grams of ground styrene-hydroxyethyl acrylate polymer were milled for 8 minutes in a Brabender Plasticorder prior to the addition of 0.176 gram of polymethylene polyphenylene isocyanate commercially available under the trade designation of Mondur MR. The temperature of the melt within the Brabender Plasticorder at the time of addition of the Mondur MR was 190° C. and the torque indication was 1150 meter grams. The resultant mixture was milled for an additional 9 minutes with the temperature of the melt increasing to 203° C. and the torque increasing to about 1,390 meter grams. The polymer was removed from the mixer and molecular weight determined by gel permeation chromatography analysis. The number average molecular weight was 118,000 grams per mole and the weight average molecular weight was 474,000 grams per mole. The polymer was subsequently ground on a Wiley Mill and sieved to provide particles passing through a 3 millimeter opening and retained on a 1.5 millimeter screen opening. Particles of the resultant resin were then pressurized with blowing agent. A portion of 9.8 grams of polymer with 0.196 grams of Kaolinite and 5 cubic centimeters of 75:25 by weight mixture of dichlorodifluoromethane and trichlorofluoromethane with 0.1 gram of water was sealed in a glass ampule which was rotated end to end at 10 revolutions per minute for 66 hours at a temperature of about 80° C. The water was added to the glass ampule prior to pressurization in order to crosslink the polymer and to aid in cell nucleation during foaming. On completion of the impregnation, the resultant polymer particles were analyzed for volatile fluid blowing agent content which was indicated to be 27.1 weight percent. Immersion of a portion of the particles in toluene for a period of 24 hours indicated a swelling ratio of 29. The immersion was done at ambient room temperature. The expansion ratio of the blowing agent impregnated particles (Sample 39) was determined for varying periods of time and was as follows:

| ER After Indicated Time in Minutes at 130° C. in Air | | | | | | |
|---|---|---|---|---|---|---|
| 0.25 | 0.5 | 1 | 3 | 56 | 7.5 | 10 |
| 16 | 40 | 59 | 107 | 136 | 164 | 170 |

The primary expansion of the particles was very good.

A number of the particles which had undergone primary expansion to an expansion ratio of about 47.7 which had been foamed for a period of about 40 seconds at a temperature of 130° C. in air were pressurized with 50 pounds per square inch gauge air for a period of 20 hours at ambient temperature (Sample 40). At the end of the 20 hours period, the particles were immediately heated to 130° C. and foaming values determined after various periods of time as set forth below.

| PF Volume | ER After Indicated Time in Minutes at 130° C. | | | | |
|---|---|---|---|---|---|
| $V_f/V_{sf}$ | 0.25 | 0.5 | 1 | 3 | 5 |
| 47.7 | 167 | 174 | 116 | 109 | 116 |
| SFR $(V_s/V_{pf})$ | 3.5 | 3.65 | 2.43 | 2.28 | 2.43 |

EXAMPLE 13

Three (3) samples were prepared by polymerizing 25 cubic centimeters of monomer in a one-inch diameter 35 cubic centimeters glass ampule. After the monomer mixture had been added to the amuple, it was sealed. The sealed ampule was then placed in a water bath having a temperature of 80° C. After three (3) days in the water bath the ampule was placed in an oven for a period of four (4) hours at a temperature of 125° C. The ampule was cooled and broken to retrieve the polymer. The polymer was ground in a Wiley Mill employing a 6 millimeter sieve. The ground polymer was sieved and particles between about 1 and 2 millimeters in size were employed for foaming tests. The monomer compositions employed were, for sample 39, 50 grams of vinyl toluene and 0.1 gram of benzoyl peroxide; for samples 40 and 41, wherein the charge to the ampule was 50 grams of vinyl toluene, 0.1 gram of benzyl peroxide and 0.028 gram of divinyl benzene which was 72 weight percent active.

The samples were impregnated with blowing agent in the following manner: 9.8 grams of polymer were dry blended with 0.2 gram of Ajax Jigger P clay obtained from Georgia Kaolin Company. The coated particles, together with 5 cubic centimeters of blowing agent were placed in glass ampules and the ampules sealed. The sealed ampules were then rotated in a glycol water bath at two revolutions per minute. Upon removal from the water bath the ampules were cooled in dry ice and then broken to retrieve the polymer particles. The polymer particles were stored at a temperature of −20° C. prior to foaming. The blowing agent employed with samples 39 and 40 was a 3 to 1 by weight mixture of difluorodichloroethane and trichlorofluoroethane. The polymer particles were exposed to the blowing agent mixture for 70 hours at a temperature of 25° C. Sample 41 was exposed to 100 percent dichlorodifluoroethane at a temperature of 50° C. for a period of 4 days. The samples 39, 40 and 41 were expanded or foamed employing a forced air oven. Primary expansion was carried out by placing the blowing agent impregnated particles in a 8"×15"×2" aluminum baking pan. Secondary expansion of the samples was done by placing the foamed particles into preheated 2"×2"×2" aluminum trays.

The primary expansion results are set forth below.

| | Primary Expansions | | | | | |
|---|---|---|---|---|---|---|
| | Sample 39 | | Sample 40 | | Sample 41 | |
| | 100° C. | 130° C. | 110° C. | 130° C. | 130° C. | 150° C. |
| Time | $V_f/V_s$ | $V_f/V_s$ | $V_f/V_s$ | $V_f/V_s$ | $V_f/V_s$ | $V_f/V_s$ |
| 1 min. | 14 | 30 | 40 | 39 | 29 | 61 |
| 3 min. | 35 | 35 | 55 | 69 | 83 | 115 |
| 5 min. | 40 | 28 | 74 | 83 | 112 | 133 |
| 10 min. | 55 | 6 | 91 | 81 | 145 | 132 |
| 20 min. | 47 | — | 114 | 76 | 167 | 119 |
| 40 min. | 42 | — | 129 | 58 | 145 | 75 |
| 60 min. | 22 | — | 122 | 42 | 122 | 59 |

After the primary expansion, the particles were subjected to a nitrogen atmosphere for a period of 3 days. The nitrogen atmosphere was at a pressure of 50 pounds per square inch guage. The value at the time zero is the expansion ratio prior to the exposure to the nitrogen atmosphere.

| | Secondary Expansions | | | |
|---|---|---|---|---|
| | Sample 39 | | Sample 40 | |
| | 110° C. | 130° C. | 110° C. | 130° C. |
| Time | $V_f/V_s$ | $V_f/V_s$ | $V_f/V_s$ | $V_f/V_s$ |
| 0 min. | 66 | 66 | 33 | 33 |
| 1 min. | 24 | 4 | 20 | 10 |
| 3 min. | 15 | 3 | 20 | 10 |
| 5 min. | 9 | 3 | 16 | 6 |
| | Sample 41 | | | |
| | 110° C. | 130° C. | 110° C. | 130° C. |
| Time | $V_f/V_s$ | $V_f/V_s$ | $V_f/V_s$ | $V_f/V_s$ |
| 0 min. | 32 | 32 | 55 | 55 |
| 1 min. | 103 | 191 | 245 | 272 |
| 3 min. | 129 | 208 | 234 | 61 |
| 5 min. | 125 | 213 | 225 | 41 |

It should be noted that sample 39 is not an illustration of the invention but is included for comparative purposes.

EXAMPLE 14

A styrene-acrylonitrile copolymer was prepared by suspension polymerization using a one gallon agitated, jacketed reactor. In the preparation of sample 42 the following reactor charge was employed: 780 grams of styrene, 280.8 grams of trichlorotrifluoroethane, commercially available under the trade designation Freon 113, 2.89 grams of benzoyl peroxide, 2.29 grams of tertiary butyl perbenzoate and 195 grams of acrylonitrile. The reactor was closed and agitated for 15 minutes at 250 revolutions per minute. Agitation was stopped and the following materials added: 1250 grams of water, 4.1 grams of carboxy methyl cellulose, 0.55 grams of sodium dichromate and 80 mg of sodium nitrate. The contents of the vessel were heated to 82° C. for 8.3 hours, subsequently heated to 120° C. for a period of 2 hours and the contents cooled and the polymer recovered. The reactor was agitated at 105 revolutions per minute for the first 3 hours and subsequently at 180 revolutions per minute. Sample 43 was prepared employing similar proportions to that of sample 42 but 0.04 weight percent of 72 weight percent active divinyl benzene was added to the monomer mixture.

Samples 42 and 43 were then expanded in the manner employing general procedures used for samples 39, 40 and 41 and the results are as follows:

| | PRIMARY EXPANSIONS | | | | |
|---|---|---|---|---|---|
| | Sample 42 | | Sample 43 | | |
| | 110° C. | 130° C. | 130° C. | 150° C. | 170° C. |
| Time | $V_f/V_s$ | $V_f/V_s$ | $V_f/V_s$ | $V_f/V_s$ | $V_f/V_s$ |
| 1 min. | — | — | — | — | 5 |
| 3 min. | 8 | 29 | 9 | 16 | 41 |
| 5 min. | 12 | 40 | 17 | 36 | 54 |
| 10 min. | 19 | 7 | 31 | 64 | 73 |
| 20 min. | 27 | 6 | 45 | 85 | 85 |
| 40 min. | 36 | — | 69 | 90 | 54 |
| 60 min. | 43 | — | 91 | 93 | 24 |

| | SECONDARY EXPANSIONS | | | |
|---|---|---|---|---|
| | Sample 42 | | Sample 43 | |
| | 130° C. | 150° C. | 130° C. | 150° C. |
| Time | $V_f/V_s$ | $V_f/V_s$ | $V_f/V_s$ | $V_f/V_s$ |
| 0 min. | 24 | 24 | 24 | 24 |
| 1 min. | 69 | 10 | 65 | 105 |
| 3 min. | 88 | 5 | 71 | 118 |
| 5 min. | 74 | 5 | 71 | 118 |
| 0 min. | 47 | 47 | 52 | 52 |
| 1 min. | 42 | 5 | 95 | 98 |
| 3 min. | 17 | 5 | 86 | 77 |
| 5 min. | 12 | 5 | 83 | 76 |

Sample 42 is not an example of the present invention but is included for comparative purposes.

Expanded polymers prepared in accordance with the present invention are readily molded into a variety of forms and shapes having low densities. The resultant moldings are resilient and exhibit highly desirable cushioning properties as indicated by dynamic testing such as the so-called 30-inch drop test and appear to be substantially superior to available expanded particle moldings prepared from commercially available starting materials.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of expanded monovinyl aromatic polymer particles comprising heating to a temperature of from about 20 to 60 degrees above the glass transition temperature of the polymer to cause the particles containing a blowing agent to form a plurality of closed gas containing cells, subjecting the expanded particles to an atmosphere of an inert gas capable of diffusing through walls of the gas containing cells at a rate greater than a volatile fluid foaming agent contained within the cells and subsequently heating the particles at a temperature above the glass transition temperature of the polymer to thereby increase the volume of the expanded particles to at least twice that of the volume of the particles prior to exposure to the inert gas with the further limitation that the expanded particles are resilient, wherein the particles having a swelling factor of at least 20 and a cross-linking coefficient of from about 0.8 to about 2.5 with the further limitation that the particles on heating to a temperature above the glass transition temperature of the polymer expand to at least 40 times their original volume at ambient temperature and on being pressurized at a pressure of at least 3 atmospheres in air for a period of 24 hours be capable of two-fold expansion when subjected to the conditions employed to expand the particles to at least 40 times their original volume.

2. The method of claim 1 wherein the particles have a swelling factor of from about 20 to 35.

3. The method of claim 1 wherein the particles are capable of forming a thermal collapse resistant foamed particle when heated to a temperature of from about 20 to 60 degrees above the glass transition temperature of the polymer.

4. The method of claim 1 wherein the particles have disposed therein a volatile organic blowing agent.

5. The method of claim 4 wherein the volatile organic blowing agent is a fluorocarbon.

6. The method of claim 4 wherein the blowing agent is a mixture of fluorocarbons.

7. The method of claim 4 wherein the blowing agent is a mixture of a fluorocarbon and a hydrocarbon.

8. The method of claim 4 wherein the blowing agent comprises dichlorodifluoromethane.

9. The method of claim 4 wherein the blowing agent comprises dichlorodifluoromethane and trichlorofluoromethane.

10. The method of claim 4 wherein the blowing agent comprises a mixture of dichlorodifluoromethane and a saturated hydrocarbon having from 4 to 5 carbon atoms in the molecule.

11. The method of claim 1 wherein the particles have a crosslinking coefficient of from about 1 to 2.25.

12. The method of claim 1 wherein the particles have a crosslinking coefficeint of from about 1 to 1.5.

13. The method of claim 1 wherein particles of a like polymer are prepared under like conditions but without a crosslinking means, the polymer has a weight average molecular weight of from about 150,000 to 600,000 grams per mole.

14. A method for the preparation of a resilient coherent foamed body, the body having a density of from about 0.2 pound per cubic foot to about 1.5 pound per cubic foot, the steps of the method comprising providing a plurality of heat expandable synthetic resinous particles, the particles forming a gel when placed in a solvent for an uncrosslinked composition of generally like monomeric constitution, the particles having a swelling factor of at least 20 and a crosslinking coefficient of from about 0.8 to about 2.5 with the further limitation that the particles on heating to a temperature above the glass transition temperature of the polymer expand to at least 40 times their original volume at ambient temperature and on being pressurized at a pressure of at least 3 atmospheres in air for a period of 24 hours be capable of two-fold expansion when subjected to the conditions employed to expand the particles to at least 40 times their original volume; expanding said particles; disposing said particles within a closed mold; heating said particles to a temperature sufficient to cause further expansion of said particles and to cause adjacent particles to fuse together to form a unitary body which is thermo collapse resistant and resilient.

15. The method of claim 14 wherein the body has a density of from about 0.2 to about 0.75 pound per cubic foot.

* * * * *